(12) United States Patent
Sasaki et al.

(10) Patent No.: US 10,532,537 B2
(45) Date of Patent: Jan. 14, 2020

(54) SANDWICH STRUCTURE, SHAPED PRODUCT, AND PRODUCTION PROCESSES THEREFOR

(71) Applicant: Toray Industries, Inc., Tokyo (JP)

(72) Inventors: Hideaki Sasaki, Nagoya (JP); Hideki Nudeshima, Nagoya (JP); Takayuki Onishi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 16/066,774

(22) PCT Filed: Dec. 12, 2016

(86) PCT No.: PCT/JP2016/086886
§ 371 (c)(1),
(2) Date: Jun. 28, 2018

(87) PCT Pub. No.: WO2017/115640
PCT Pub. Date: Jul. 6, 2017

(65) Prior Publication Data
US 2019/0009497 A1    Jan. 10, 2019

(30) Foreign Application Priority Data

Dec. 28, 2015  (JP) ................................. 2015-256514

(51) Int. Cl.
*B32B 3/30*     (2006.01)
*B32B 7/02*     (2019.01)
(Continued)

(52) U.S. Cl.
CPC .............. *B32B 3/30* (2013.01); *B29C 43/206* (2013.01); *B29C 70/46* (2013.01); *B32B 3/266* (2013.01); *B32B 5/024* (2013.01); *B32B 5/12* (2013.01); *B32B 7/02* (2013.01); *B32B 27/08* (2013.01); *B32B 27/32* (2013.01); *B32B 27/38* (2013.01); *B29K 2023/12* (2013.01);
(Continued)

(58) Field of Classification Search
CPC ........................................................ B32B 3/30
USPC ......................................................... 428/119
See application file for complete search history.

(56) References Cited

U.S. PATENT DOCUMENTS

2017/0136717 A1* 5/2017 Yoshida .............. B29C 44/1276

FOREIGN PATENT DOCUMENTS

JP         06-120627 A     4/1994
JP         2001-253001 A   9/2001
(Continued)

*Primary Examiner* — Brent T O'Hern
(74) *Attorney, Agent, or Firm* — DLA Piper LLP (US)

(57) ABSTRACT

A sandwich structure which is configured of skin layers each including at least one layer selected from among a metal layer, a fiber-reinforced resin layer (X) that includes continuous fibers and a matrix resin (A), and a fiber-reinforced resin layer (Y) that includes discontinuous fibers and a heat-curable matrix resin (B) and of a core layer including a flowable core layer that includes discontinuous fibers and a matrix resin (C), wherein the skin layers are constituted of a material which has a flexural modulus higher than that of the core layer, and a through part has been formed in a region that lies in at least some of the skin layers. In the sandwich structure, an upright part which projects in an out-of-plane direction of skin layer and which has high strength and a complicated shape such as a rib is obtained by an easy method.

2 Claims, 14 Drawing Sheets

(51) Int. Cl.
- *B29C 43/20* (2006.01)
- *B29C 70/46* (2006.01)
- *B32B 3/26* (2006.01)
- *B32B 5/02* (2006.01)
- *B32B 5/12* (2006.01)
- *B32B 27/08* (2006.01)
- *B32B 27/32* (2006.01)
- *B32B 27/38* (2006.01)
- *B29K 23/00* (2006.01)
- *B29K 63/00* (2006.01)
- *B29K 105/08* (2006.01)
- *B29K 105/12* (2006.01)
- *B29K 307/04* (2006.01)
- *B29K 309/08* (2006.01)

(52) U.S. Cl.
CPC .... *B29K 2063/00* (2013.01); *B29K 2105/089* (2013.01); *B29K 2105/0845* (2013.01); *B29K 2105/0881* (2013.01); *B29K 2105/12* (2013.01); *B29K 2307/04* (2013.01); *B29K 2309/08* (2013.01); *B32B 2250/40* (2013.01); *B32B 2260/023* (2013.01); *B32B 2260/046* (2013.01); *B32B 2262/101* (2013.01); *B32B 2262/106* (2013.01); *B32B 2307/54* (2013.01); *B32B 2307/72* (2013.01)

(56) References Cited

FOREIGN PATENT DOCUMENTS

| | | |
|---|---|---|
| JP | 2005-313613 A | 11/2005 |
| JP | 2008-051224 A | 3/2008 |
| JP | 2012-148443 A | 8/2012 |
| JP | 2013-176984 A | 9/2013 |
| JP | 2014-172241 A | 9/2014 |
| JP | 2016-043680 A | 4/2016 |
| JP | 2017-078433 A | 5/2016 |
| WO | 2015/029634 A1 | 3/2015 |
| WO | 2015/194349 A1 | 12/2015 |

* cited by examiner

SANDWICH STRUCTURE, SHAPED PRODUCT, AND PRODUCTION PROCESSES THEREFOR

TECHNICAL FIELD

This disclosure relates to a sandwich structure, shaped product, and production processes therefor, the sandwich structure and the shaped product being lightweight and having high strength and high rigidity and being suitable for component parts or housing parts of PCs, office automation equipment, cell-phones or the like, specifically with an upright part such as rib shaped easily and surely to have a desirable shape and strength.

BACKGROUND

Reduction in size and weight has been demanded as corresponding to advancing portabilization of electric and electronic equipment such as PCs, office automation equipment, audio-visual equipment, cell-phones, telephones, facsimile machines, home electric appliances and toys. To meet the demand, sheet thinning is required together with high strength and high rigidity so that equipment component parts such as a housing is prevented from greatly bending to contact and break inner component parts even when an external load is applied.

Further, a shaped product having an upright part such as a rib and boss may be formed by filling a rib-forming part with reinforced fibers or filling it with mat-shaped reinforcing fibers in shaping the product. In the former case, thermoplastic resin base material containing randomly-oriented discontinuous reinforcing fibers is usually employed to perform a press forming, which may be difficult to achieve otherwise.

The rib may be formed in a forming mold by filling the rib-forming part with flowable base material and consists of reinforcing fibers and matrix resin made of thermoplastic resin when the base material is subject to press forming with the forming mold. It is important that a complicated shape of the rib or the like should be formed precisely by the pressing to sufficiently fill the rib-forming part with the reinforcing fibers without generating resin-rich parts.

A sandwich structure consisting of a light core layer and a rigid skin layer may be used for sheet thinning. It is important to provide a shaped product having a competitive cost as a universal housing for electronic component parts by forming an upright part having high strength and complicated shape such as a rib projecting in an out-of-plane direction of the skin layer by a simple method such as a one-motion forming method.

JP2012-148443-A discloses a configuration and an advantage, the configuration being that "a material is subject to a press working in a mold to make a rib while another material is melt in another mold and is subject to a pressing working to make a panel, the rib is heated at a temperature higher than the melting point of the thermoplastic resin, the another mold is once opened to place the heated rib on the panel, and then the another mold is closed again to perform a press working to provide fiber reinforced resin material having a ribbed structure, wherein a weight average fiber length content of the material to form the rib is less than that of the another material to form the panel," the advantage is that "the ribbed panel made of fiber reinforced resin is effectively prevented from generating sink on a surface of the panel opposite to a ribbed surface."

Although JP '443 discloses a method of integrating by press working the rib-forming part and the other parts which have been formed separately in each mold, the reinforcing fibers might not achieve sufficient reinforcement because a break or an interface tends to remain in the reinforcing fibers existing at a boundary part of both formed parts. Further, fluidity of the forming material itself cannot be utilized because both parts have been formed before press working and therefore materials are not likely to flow greatly between both parts at press working although the fluidity is supposed to be exhibited as excellent when a whole material is integrated by a press working. Therefore, it may become difficult to perform a desired three-dimensional shape easily.

JP2014-172241-A discloses a configuration and an advantage, the configuration being that "a shaped product, which has at least one upright part which is pressed and formed as projecting from a plane-forming part in an out-of-plane direction and comprises a first fiber reinforced thermoplastic resin layer and a second fiber reinforced thermoplastic resin layer laminated on at least one surface thereof, the first fiber reinforced thermoplastic resin layer having a first reinforcing fiber layer in which reinforcing fibers are randomly-oriented, the second fiber reinforced thermoplastic resin layer having a second reinforcing fiber layer, the second fiber reinforced thermoplastic resin layer being ruptured at the upright part while the first reinforcing fiber layer continuously extends between the plane-forming part and an inside of the upright part," the advantage being that "the reinforcing resin can sufficiently reinforce the product without generating substantive boundary between the plane-shaped part and the inside of the upright part because the reinforcing fiber layer continuously extends between the plane-forming part and an inside of the upright part".

In the configuration disclosed in JP '241, the second fiber reinforced thermoplastic resin layer is ruptured at the upright part and the first reinforcing fiber layer of the first fiber reinforced thermoplastic resin layer continuously extends between the plane-forming part and an inside of the upright part through the ruptured part so that the second fiber reinforced thermoplastic resin layer may be too weak to function as a skin layer of sandwich structure such as housing requiring a high rigidity.

JP2013-176984-A discloses a configuration and an advantage, the configuration being that "a rib structure provided in a shaped product made by pressing a preform comprising a sheet-shaped forming material (A) having a concentration parameter above a predetermined level, discontinuous reinforcing fiber, thermoplastic resin and a sheet-shaped forming material (B) having a concentration parameter below a predetermined level with an open mold having an opening to form the rib structure and a counter mold facing thereof, wherein an area of the forming material (A) is set to 70% or more of a projection area of shaped product, the forming material (B) is placed at an opening position of the opening, the forming material (A) is placed between the forming material (B) and the open mold, and the forming material (A) has a penetration part in a projection region of the opening," the advantage being that "a shaped product of fiber reinforced composite material achieving both formations of the rib structure and face plate part excellent in surface appearance, dimensional accuracy and reliability is obtained."

In the configuration disclosed in JP '984, the penetration part of the forming material (A) has a width narrower than that of rib opening so that filling the rib-forming part with the forming material B should be improved. Further, the surface layer is made from the discontinuous reinforcing fibers and thermoplastic resin so that the surface layer should be improved in rigidity and strength.

It could therefore be helpful to provide a sandwich structure, shaped product, and production processes therefor, the sandwich structure and the shaped product being lightweight and having high strength and high rigidity, specifically with an upright part such as rib shaped easily and surely to have a desirable shape and strength, wherein the upright part having a complicated shape such as rib projecting in an out-of-plane direction of a skin layer can be formed by a simple method such as one-motion forming method.

SUMMARY

We thus provide:

(1) A sandwich structure comprising a skin layer and a core layer, the skin layer including at least one layer of: a metal layer; a fiber reinforced resin layer (X) comprising a continuous fiber and a matrix resin (A) and; a fiber reinforced resin layer (Y) comprising a discontinuous fiber and a thermosetting matrix resin (B), the core layer including a fluid core layer comprising a discontinuous fiber and a matrix resin (C), wherein the skin layer is made of a material having a bending elastic modulus higher than that of the core layer and is provided at least partially with a penetration part.

(2) The sandwich structure according to (1), wherein the fiber reinforced resin layer (X) is either a unidirectional fiber reinforced resin layer comprising a unidirectional continuous fiber of the continuous fiber and a thermosetting resin of the matrix resin (A) or a woven fiber reinforced resin layer comprising a continuous fiber woven fabric of the continuous fiber and a thermosetting resin of the matrix resin (A), the skin layer being a laminate consisting of one or more layers of the unidirectional fiber reinforced resin layer and/or the woven fiber reinforced resin layer.

(3) A shaped product provided with at least one upright part formed on the sandwich structure in an out-of-plane direction of the sandwich structure according to (1) or (2), wherein the upright part is a part of the core layer extending through the penetration part.

(4) The shaped product according to (3), wherein the skin layer at a non-design face side is partially provided with the penetration part.

(5) The shaped product according to (4), wherein the skin layer at a design face side is partially provided with the penetration part and the penetration part at the design face side faces to the penetration part at the non-design face side.

(6) The shaped product according to (5), wherein a region in which the penetration part at the design face side faces to the penetration part at the non-design face side is wave-permeable.

(7) The shaped product according to any one of (3) to (6), wherein an opening area of at least one penetration part provided at the non-design face side is greater than a vertical cross section area of the upright part at a level of 10% lower than a tip height of the upright part formed through the penetration part.

(8) The shaped product according to (7), wherein: the opening area of the penetration part provided with the upright part at the non-design face side is 1.1 to 10 times as large as the upright part cross section area; or the opening area of the penetration part provided with a plurality of the upright parts is 1.1 to 2 times as large as a total cross section area of the upright parts.

(9) A production process for a sandwich structure comprising step [1] to step [3]: step [1] of providing a penetration part partially on a skin layer; step [2] of sandwiching a core layer including a fluid core layer by the skin layers provided with the penetration part from both sides to prepare a sandwich precursor; and step [3] of integrating the sandwich precursor to prepare a sandwich structure.

(10) A production process for a sandwich structure comprising step [1] to step [3]: step [1] of sandwiching a core layer including a fluid core layer by skin layers from both sides to prepare a sandwich precursor; step [2] of integrating the sandwich precursor to prepare a sandwich structure; and step [3] of providing a penetration part on at least a part on the skin layer of the sandwich structure.

(11) A production process for a shaped product comprising step [1] to step [3]: step [1] of providing a penetration part on at least a part of a skin layer; step [2] of sandwiching a core layer including a fluid core layer by the skin layers provided with the penetration part at least on one side from both sides to prepare a sandwich precursor; and step [3] of placing the sandwich precursor in a forming mold to be closed to integrate the sandwich precursor and flowing a fluid core layer through the penetration part into a cavity of forming mold so that the fluid core layer projects in an out-of-plane direction from the skin layer surface to form at least one upright part extending continuously with the fluid core layer.

(12) A production process for a shaped product by using the sandwich structure produced by the production process according to (9) or (10), wherein the sandwich structure is placed in a forming mold to be closed to flow a fluid core layer through a penetration part into a cavity of forming mold so that the fluid core layer projects in an out-of-plane direction from the skin layer surface to form at least one upright part extending continuously with the fluid core layer.

(13) A production process for a shaped product comprising step [1] to step [4]: step [1] of providing a penetration part on at least a part of a skin layer; step [2] of sandwiching a core layer including a fluid core layer from both sides by skin layers at least one of which is provided with the penetration part to prepare a sandwich precursor; step [3] of placing the sandwich precursor in a forming mold and closing the forming mold to integrate the sandwich precursor into a sandwich structure, and further melting a matrix resin in the fluid core layer; and step [4] of conveying and placing the sandwich structure in another forming mold at a temperature regulated below the melting point of matrix resin in the fluid core layer, and closing the mold to flow the fluid core layer through the penetration part into a cavity of the forming mold so that the fluid core layer gets upright in an out-of-plane direction from the skin layer surface to form at least one upright part extending continuously with the fluid core layer.

(14) The production process for a shaped product according to any one of (11) to (13), further comprising a step of carrying out an autoclave molding or a press molding.

It is possible that our sandwich structure, shaped product, and production processes therefor described above provides a shaped product being lightweight and having less warp with high strength and high rigidity, specifically with an upright part such as rib shaped easily and surely to have a desirable shape and strength, wherein the upright part having a complicated shape such as rib projecting in an out-of-plane direction of a skin layer is formed by a simple method.

EXPLANATION OF SYMBOLS

Figure 1:
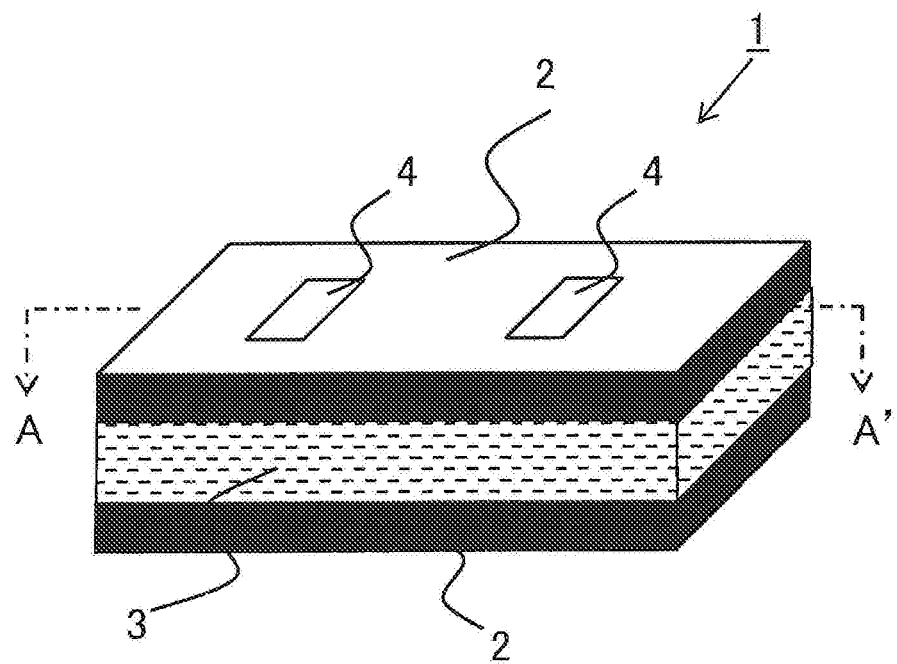
FIG. 1 is a schematic perspective view of a sandwich structure consisting of skin layers provided with a penetration part and a core layer including a fluid core layer according to an example.

1: sandwich structure
2: skin layer
3: core layer
4: penetration part
5: unidirectional fiber reinforced resin layer
6: unidirectional fiber reinforced resin layer
7: shaped product
8: upright part
9: base of upright part
20: pair of molds
21: lower mold
22: upper mold
23: groove
24: depressed part
25: protruding part
26: resin-rich part

DETAILED DESCRIPTION

Hereinafter, our structures, products and methods will be explained with reference to drawings. However, the scope of this disclosure is not limited by drawings.

Figure 2:
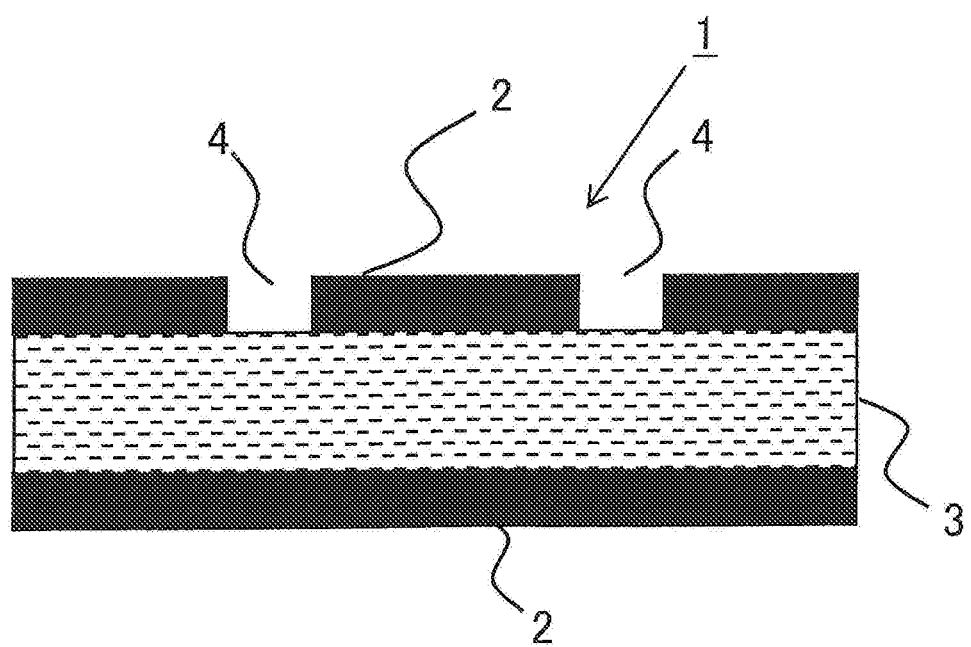
FIG. 2 is a cross section view of A-A' in FIG. 1.

FIG. 1 shows sandwich structure 1 comprises skin layers 2 and core layer 3, the skin layers 2 includes at least any one layer of metal layer, fiber reinforced resin layer (X) consisting of continuous fibers and matrix resin (A) or fiber reinforced resin layer (Y) consisting of discontinuous fibers and thermosetting matrix resin (B), the core layer 3 including a fluid core layer consisting of discontinuous fibers and matrix resin (C), wherein skin layers 2 is made of a material of which bending elastic modulus is greater than that of core layer 3 and provided with penetration part 4 in at least one region of skin layer 2. FIG. 2 is a cross section view of A-A' shown in FIG. 1, in which penetration part 4 has an opening to expose a part of core layer 3.

It is important for skin layer 2 to comprise at least one layer of metal layer, continuous fibers and matrix resin (A) or fiber reinforced resin layer (Y) consisting of discontinuous fibers and thermosetting matrix resin (B).

A metal layer constituting skin layer 2 may be made of an element selected from titanium, steel, aluminum, magnesium, iron, silver, gold, platinum, copper and nickel, or may be an alloy containing an element thereof as a primary component. The metal may be provided as a film-shaped or sheet-shaped material. Also, it is possible to use two or more kinds of these materials.

When fiber reinforced resin layer (X) consisting of continuous fibers and matrix resin (A) is employed, thermosetting resin or thermoplastic resin is employed as matrix resin (A). The thermosetting resin may be unsaturated polyester resin, vinyl ester resin, epoxy resin, (resol-type) phenol resin, urea-melamine resin, polyimide resin or the like, or may be a copolymer, denatured compound, or blended resin of two or more kinds thereof. Above all, it is preferable that the thermosetting resin contains epoxy resin. Also, the thermosetting resin may contain another filler or additive as needed. It may contain elastomer or rubber component, inorganic filler, fire retardant, conductivity imparting agent, antibacterial agent, insect repellent, deodorant, coloration inhibitor, release agent, antistatic agent, plasticizer, coloring agent, pigment, dye, foaming agent, antifoaming agent, coupling agent or the like.

The thermoplastic resin may be polyethylene terephthalate (PET) resin, polybutylene terephthalate (PBT) resin, poly trimethylene terephthalate (PTT) resin, polyethylene naphthalate (PEN) resin, polyester resin such as liquid crystal polyester resin, polyolefin resin such as polyethylene (PE) resin, polypropylene (PP) resin and polybutylene resin, styrene-based resin, polyoxymethylene (POM) resin, polyamide (PA) resin, polycarbonate (PC) resin, polymethylene methacrylate (PMMA) resin, polyvinyl chloride (PVC) resin, polyphenylene sulfide (PPS) resin, polyphenylene ether (PPE) resin, denatured PPE resin, polyimide (PI) resin, polyamide-imide (PAI) resin, polyetherimide (PEI) resin, polysulfone (PSU) resin, denatured PSU resin, polyether sulfone (PES) resin, polyketone (PK) resin, polyether ketone (PEK) resin, polyetheretherketone (PEEK) resin, polyether ketone ketone (PEKK) resin, polyarylate (PAR) resin, polyether nitrile (PEN) resin, phenolic resin, phenoxy resin, fluorinated resin such as the polytetrafluoroethylene, thermoplastic elastomer based on polystyrene, polyolefin, polyurethane, polyester, polyamide, polybutadiene, polyisoprene, fluorine or the like, or may be a copolymer, denatured compound, or blended resin of two or more kinds thereof. The thermoplastic resin may contain elastomer or rubber component for improving impact-resistance. It is preferable to employ: the PPS resin from viewpoints of heat resistance and chemical resistance; the polycarbonate resin or styrene-based resin from viewpoints of dimension stability; or the polyamide resin from viewpoints of strength and impact resistance of shaped product. The thermoplastic resin may contain another filler or additive as needed. It may contain inorganic filler, fire retardant, conductivity imparting agent, crystalline nucleus agent, ultraviolet absorbing agent, antioxidant, damping agent, antibacterial agent, insect repellent, deodorant, coloration inhibitor, heat stabilizer, release agent, antistatic agent, plasticizer, lubricant, coloring agent, pigment, dye, foaming agent, antifoaming agent, coupling agent or the like.

When fiber reinforced resin layer (Y) consisting of discontinuous fibers and thermosetting matrix resin (B) is employed, thermosetting resin exemplified above for matrix resin (A) may be employed as matrix resin (A).

Core layer 3 includes a fluid core layer which easily fluidizes by heating or pressuring and may be a lightweight core layer for the purpose of light-weighting as needed. The fluid core layer may be a fiber reinforced resin layer consisting of discontinuous fiber and matrix resin (C), in which matrix resin (C) is either thermosetting resin or thermoplastic resin exemplified above. It is preferable that the lightweight core layer is provided as one or more kinds of resin film, sheet and foam. The lightweight core layer may contain thermoplastic resin or thermosetting resin exemplified above. It is preferable that it may contain a material made by inflating fiber reinforced resin containing discontinuous fibers with the resin in a thickness direction.

Sandwich structure 1 may be used as a precursor (which may be called preform) which can easily be provided with upright part 8 such as rib and boss projecting in an out-of-plane direction of shaped product. For example, upright part 8 such as rib can be formed by pressurizing like pressing to flow core layer 3 easily through penetration part 4 provided on skin layer 2 when core layer 3 is made of a material to be fluidized easily by heating or pressurizing.

It is important that skin layer 2 is made of a material of which bending elastic modulus is greater than that of core layer 3. This configuration can suppress deformation such as warping at the time of shaping to make a structure of high strength and high rigidity.

It is preferable that the fiber reinforced resin layer (X) has a unidirectional fiber reinforced resin layer made of unidirectional continuous fibers and thermosetting resin as matrix resin (A) or a woven fiber reinforced resin layer made of a continuous fiber woven fabric as continuous fiber and thermosetting resin as matrix resin (A).

It is also preferable that skin layer 2 comprises a layered product made of one or more layers of the unidirectional fiber reinforced resin layer or the woven fiber reinforced resin layer, or alternatively comprises a layered product made of one or more layers of each the unidirectional fiber reinforced resin layer and the woven fiber reinforced resin layer.

Figure 3:
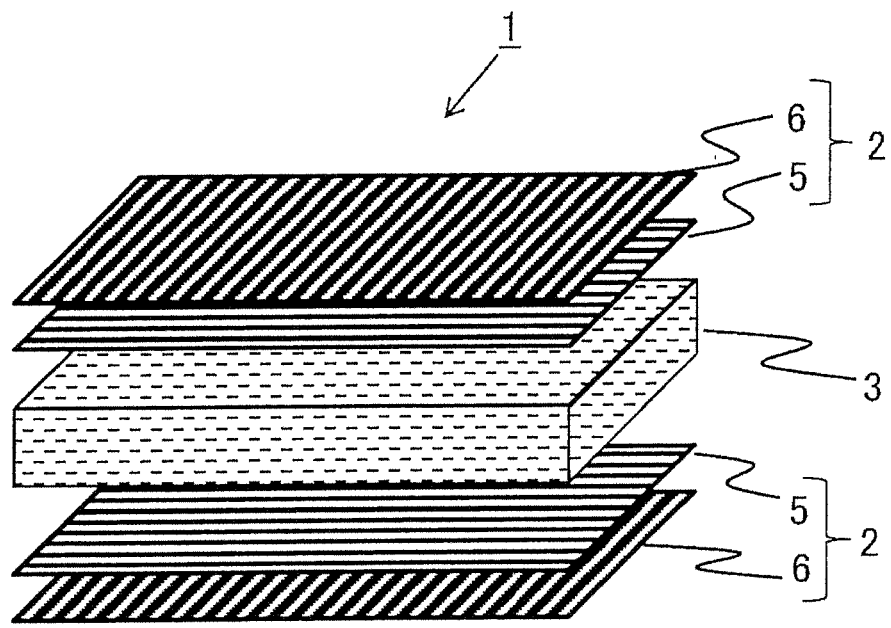
FIG. 3 is a schematic perspective view showing a lamination state in which a core layer is sandwiched by skin layers of unidirectional fiber reinforced resin layer.

FIG. 3 is a schematic perspective view showing a sandwich structure 1 in which core layer 3 is sandwiched by skin layers 2 of unidirectional fiber reinforced resin layer. As shown in FIG. 3, two sheets of unidirectional fiber reinforced resin layers of which fiber orientation directions are orthogonal are laminated to enhance rigidity of skin layer 2 on one side in the direction of 90° relative to fiber direction of each unidirectional fiber reinforced resin layer.

When the unidirectional fiber reinforced resin layers or woven fiber reinforced resin layers are laminated to make skin layer 2, sandwich structure 1 having high surface rigidity can be obtained even when skin layer 2 itself is a thin film. Such a configuration can achieve a high reinforcement to an upright part which may be formed in out-of-plane direction of the skin layer, as described later.

The "discontinuous fiber" means fiber other than the configuration in which fibers are continuously provided along total length or total width of sandwich structure 1 or shaped product. From a viewpoint of keeping a balance between fluidity of fluid core layer consisting of discontinuous fibers and matrix resin (C) and reinforcement of reinforcing fiber, it is preferable that the discontinuous fiber has a number average fiber length of 20 mm or less, and is preferably 10 mm or less, further preferably 3 mm or less, although there is no particular limitation of the fiber length of discontinuous fiber. From viewpoints of high rigidity and high strength of fiber reinforced resin layer (X) consisting of continuous fibers and matrix resin (A), it is preferable that the continuous fiber has a number average fiber length of 20 mm or more, and is preferably 50 mm or more, further preferably 100 mm or more.

The discontinuous fiber employed as skin layer 2 or core layer 3 is not limited in particular, and may be a carbon fiber based on PAN, rayon, lignin or pitch, an insulative fiber such as graphitic fiber and glass fiber, an organic fiber such as aramid resin, PBO resin, polyphenylene sulfide resin, polyester resin, acrylic resin, nylon resin and polyethylene resin or an inorganic resin such as silicon carbide and silicon nitride. These fibers may be subject to a surface treatment. The surface treatment may be a conductive metal adhesion treatment or alternatively, treatment with coupling agent, treatment with sizing agent, treatment with binding agent, adhesion treatment with additive or the like. It is possible to employ one kind of these reinforcing fibers alone, or two or more kinds thereof as a combination. Above all, it is preferable to employ the PAN-based, pitch-based or rayon-based carbon fiber excellent in specific strength and specific rigidity, from a viewpoint of light weight.

From a viewpoint of enhancing economic efficiency of shaped product 7 to be provided, it is preferable to employ glass fiber. It is preferable to employ both carbon fiber and glass fiber from a viewpoint of balance between mechanical characteristics and economic efficiency. From viewpoints of enhancing impact absorbance and formability of shaped product, it is preferable to employ aramid fiber, preferably both carbon fiber and aramid fiber from a viewpoint of balance between mechanical characteristics and impact absorbance. From a viewpoint of enhancing conductivity of shaped product to be provided, it is possible to employ reinforced fiber coated by metal such as nickel, copper and ytterbium. Above all, it is preferable to employ the PAN-based carbon fiber excellent in mechanical characteristics such as strength and elastic modulus.

The continuous fiber constituting skin layer 2 may be the same kind of reinforcing fiber as the discontinuous fiber employed for core layer 3 described above.

From a viewpoint of rigidity of sandwich structure 1, it is preferable that the continuous fiber has a tensile elastic modulus of 150 to 1,000 GPa, preferably 300 to 800 GPa. The tensile elastic modulus of reinforcing fiber of less than 150 GPa might deteriorate rigidity of sandwich structure 1 while that of more than 1,000 GPa might make it difficult to produce reinforcing fiber unless the crystallinity of the reinforcing fiber is enhanced greatly. The tensile elastic modulus of reinforcing fiber within the preferable range can improve rigidity of sandwich structure 1 and productivity of reinforcing fiber. The tensile elastic modulus of reinforcing fiber can be measured by the strand-tensile test described in JIS R7601-1986.

When skin layer 2 is fiber reinforced resin layer (X) consisting of continuous fiber and matrix resin (A), it is preferable that skin layer 2 contains continuous fiber of 5 to 80 mass % and matrix resin (A) of 20 to 95 mass %. It is preferable that it contains continuous fiber of 7 to 70 mass % and matrix resin (A) of 30 to 93 mass %, more preferably containing continuous fiber of 20 to 50 mass % and matrix resin (A) of 50 to 80 mass %, and further preferably containing continuous fiber of 25 to 40 mass % and matrix resin (A) of 60 to 75 mass %. The continuous fiber of less than 5 mass % or and the matrix resin (A) of more than 95 mass % might deteriorate rigidity of sandwich structure 1 or shaped product. The continuous fiber of more than 80 mass % and the matrix resin (A) of less than 20 mass % might cause poor appearance such as blur on sandwich structure 1 or shaped product.

When skin layer 2 is fiber reinforced resin layer (Y) consisting of discontinuous fiber and thermosetting matrix resin (B), it is preferable that it contains discontinuous fiber of 5 to 75 mass % and thermosetting matrix resin (B) of 25 to 95 mass %. It is preferable that it contains discontinuous fiber of 7 to 70 mass % and thermosetting matrix resin (B) of 30 to 93 mass %, more preferably discontinuous fiber of 20 to 50 mass % and thermosetting matrix resin (B) of 50 to 80 mass %, and further preferably discontinuous fiber of 25 to 40 mass % and thermosetting matrix resin (B) of 60 to 75 mass %. The discontinuous fiber of less than 5 mass % and thermosetting matrix resin (B) of more than 95 mass % might deteriorate rigidity of sandwich structure 1 or shaped product. The discontinuous fiber of more than 75 mass % and thermosetting matrix resin (B) of less than 25 mass % might cause poor appearance such as blur on sandwich structure 1 or shaped product.

When core layer 3 is fluid core layer consisting of discontinuous fiber and matrix resin, it is preferable that it contains discontinuous fiber of 5 to 75 mass % and matrix resin of 25 to 95 mass %. It is preferable that it contains discontinuous fiber of 7 to 70 mass % and matrix resin of 30 to 93 mass %, more preferably discontinuous fiber of 20 to 50 mass % and matrix resin of 50 to 80 mass %, and further preferably discontinuous fiber of 25 to 40 mass % and matrix resin of 60 to 75 mass %. The discontinuous resin of less than 5 mass % and matrix resin of more than 95 mass % might deteriorate strength of upright part. The discontinuous fiber of more than 75 mass % and matrix resin of less than 25 mass % might deteriorate specific rigidity of sandwich structure 1.

The content ratio of each reinforcing fiber and matrix resin contained in skin layer or the fluid core layer as core layer 3 can be determined by weighing the reinforcing fiber left by removing the matrix resin component from skin layer 2 or the fluid core layer although another determination may be possible. The dissolution method or the burn-out method may be employed for a method to remove the matrix resin component from skin layer 2 or the fluid core layer. It can be weighed with an electronic scale or an electronic balance. It is preferable that a measurement sample is cut into 100 mm×100 mm square to average three measured values for the number of measurements n=3.

Next, shaped product 7 made from sandwich structure 1 will be explained.

Figure 4:
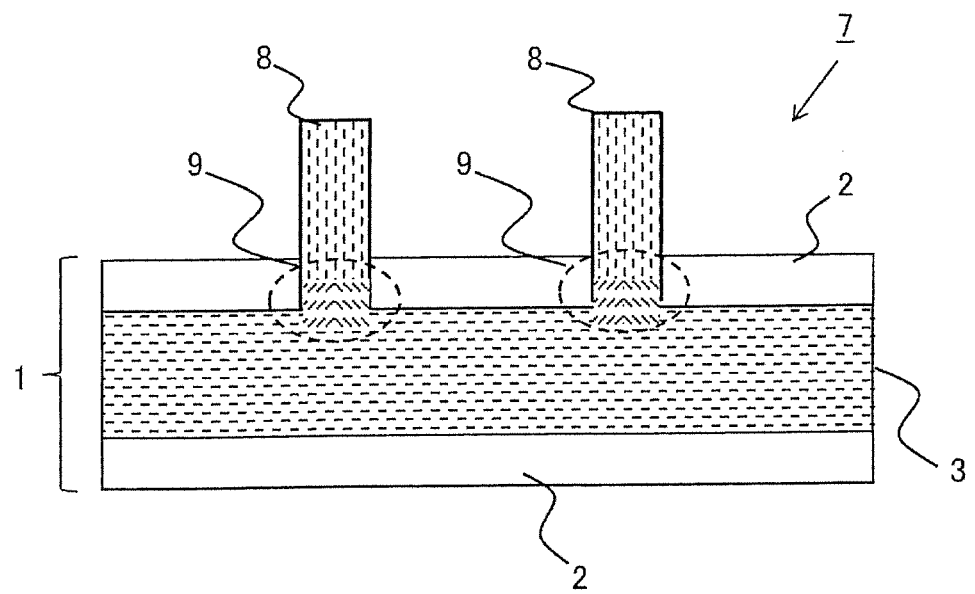
FIG. 4 is a cross section view of a shaped product provided with an upright part projecting in an out-of-plane direction of a sandwich structure.

FIG. 4 shows shaped product 7 provided with at least one upright part 8 projecting in an out-of-plane direction of sandwich structure 1 while upright part 8 is a part of core layer 3 extending through penetration part 4 provided on skin layer 2.

Figure 5:
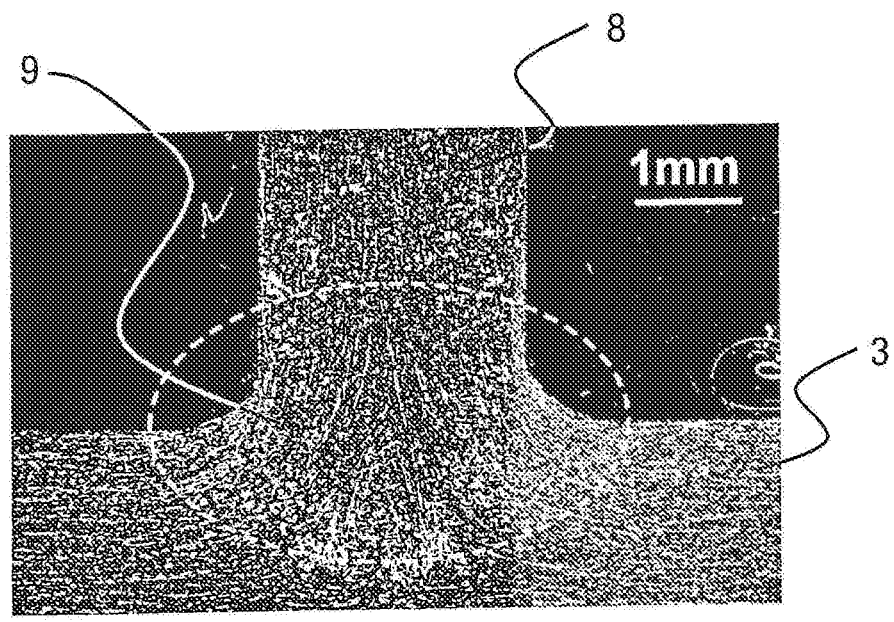
FIG. 5 is an image of cross section of a shaped product observed with a light microscope.

The upright part 8 means a part provided with a component part such as rib and boss formed in an out-of-plane direction of sandwich structure 1. It is preferable that core layer 3 is a fluid core layer so that upright part 8 is formed by flowing a part of core layer 3 by press working to be described later. It is preferable that the fluid core layer is made by randomly-dispersing discontinuous fibers contained in matrix resin (C). Such a fluid core layer can make most of discontinuous fibers orient in a direction toward the upright part around base 9 of the upright part as shown in FIG. 5 so that core layer 3 and upright part 8 is adjacent without boundary therebetween to exhibit mechanical characteristics greater than another configuration in which upright part 8 is separately provided and integrated later.

It is preferable that penetration part 4 is at least provided at a part of skin layer 2 on non-design face of shaped product 7. Thus, upright part 8 is formed on the non-design face of shaped product 7 so that interior materials such as electronic parts can be placed.

Figure 6:
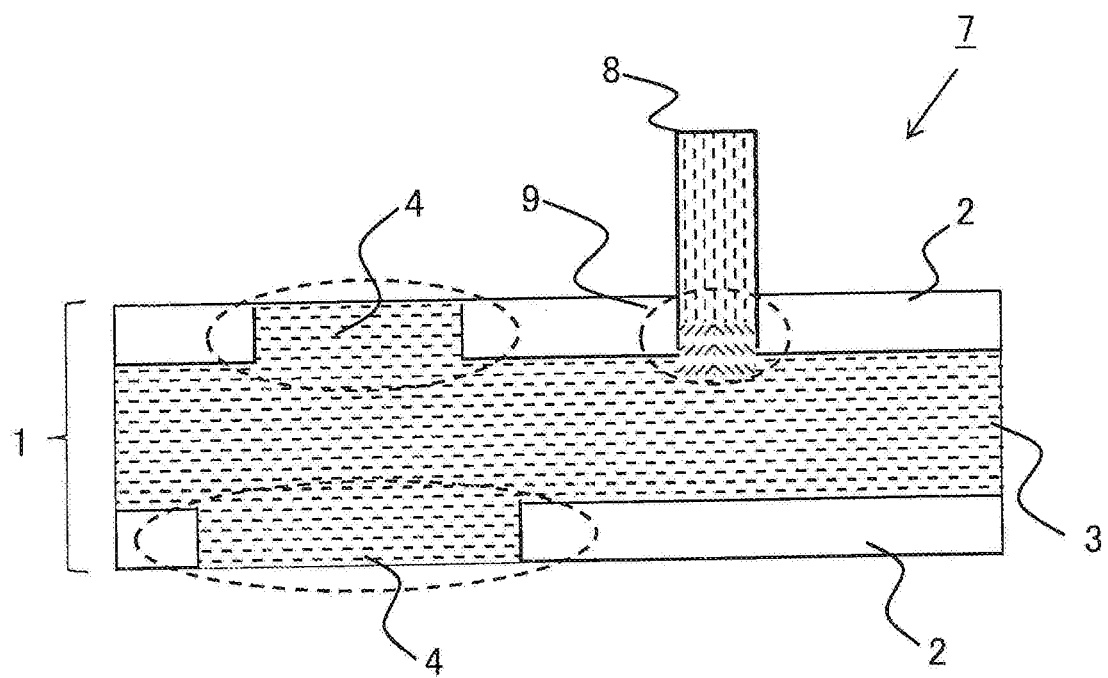
FIG. 6 is a cross section view of a shaped product provided with an upright part in addition to opposed penetration parts provided on a design face and a non-design face.

It is preferable that penetration parts 4 are provided at least on the non-design face and skin layer 2 at the design face so that at least one penetration part 4 at the design face side faces to at least one penetration part 4 at the non-design face side as shown in FIG. 6. The "face" includes a configuration in which two projection profiles partially overlap, wherein the projection profiles are made by projecting each region of at least one penetration part 4 at the design face side and non-design face side in thickness direction of shaped product 7.

Thus, it is preferable that penetration parts 4 are provided as facing to each other on the non-design face and design face so that shaped product 7 having both functions of electric wave permeability and electromagnetic wave shield can be produced. Specifically, core layer 3 made of material having the electric wave permeability can secure a wave-permeable region because electric wave-permeable core layer 3 only exists in a region where penetration parts 4 are facing to each other. On the other hand, skin layer 2 made of material having electromagnetic wave shield characteristics can secure an electromagnetic wave shield in a region covered with skin layer 2. By combining these techniques, electric wave-permeable region can be freely designed and provided flexibly at a region specifically requiring electric wave permeability.

In shaped product 7 having at least one upright part 8, it is preferable that skin layer 2 is provided with penetration part 4 having an area greater than the vertical cross section area of the upright part at a level of 10% lower than the tip height.

Figure 7:
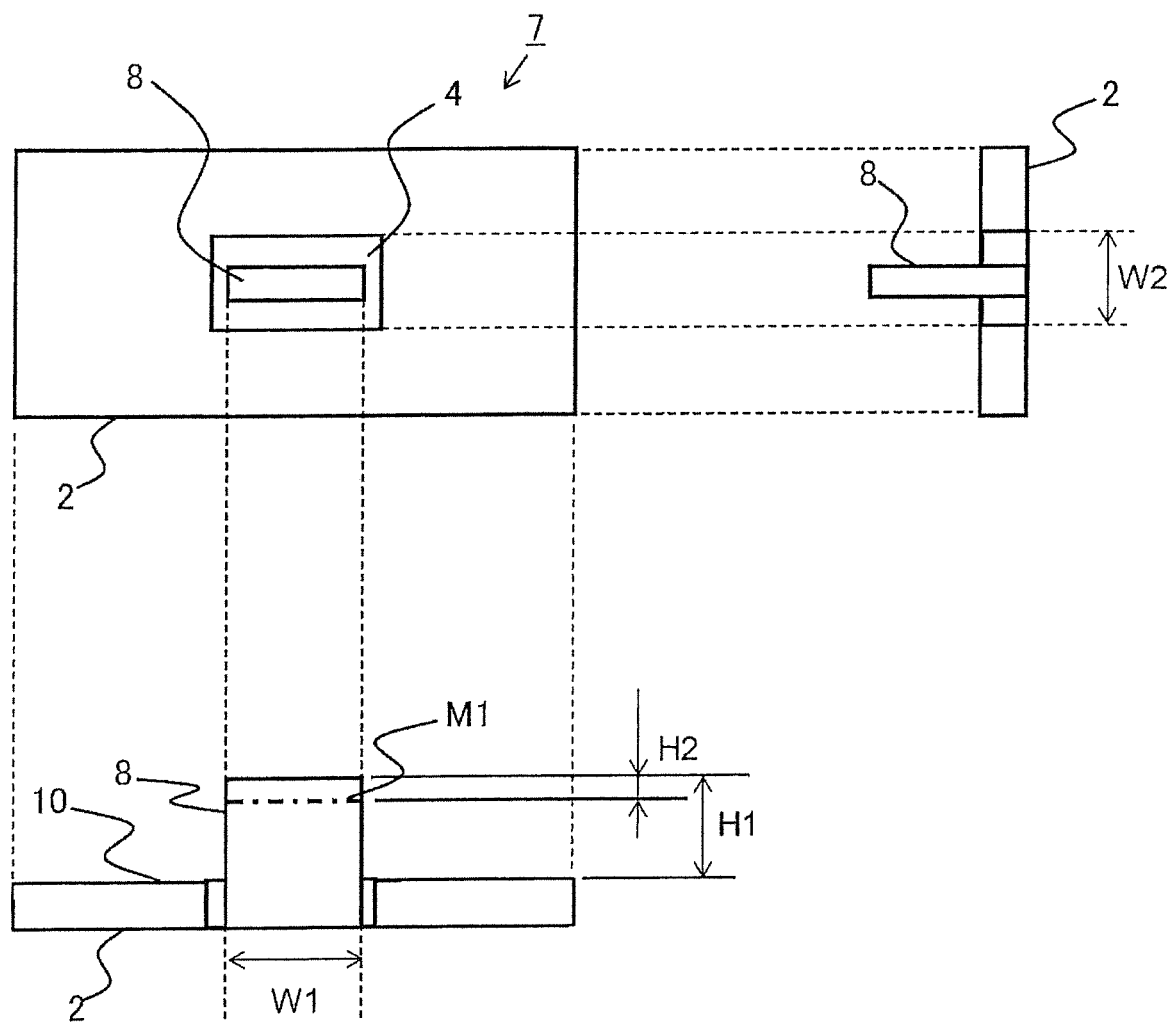
FIG. 7 shows a plan view, right side view and a front cross section view of a shaped product provided with an upright part extending continuously from a core layer through a penetration part formed on a skin layer.

The relation among these areas will be explained with reference to FIG. 7. FIG. 7 shows a plan view, right side view and a front cross section view of shaped product 7, specifically showing skin layer 2 including upright part 8 while omitting core layer 3. It is preferable that opening area M2 is greater than upright part cross section area M1, when M2 is defined as an opening area of penetration part 4 while M1 is defined as a cross section area (upright part cross section area) orthogonal to the upright part vertical direction at a level of lower than the tip of upright part 8 by 10% (H2=H1×10%) of upright part tip height H1 above the reference height of external surface 10 of skin layer 2.

When such a relation is satisfied, discontinuous fibers and matrix resin component constituting core layer 3 can easily flow through penetration part 4 to the opening of mold to form upright part 8 so that upright part 8 can be filled uniformly with components of core layer 3.

When one penetration part 4 is provided with one upright part 8, it is preferable that opening area M2 of penetration part 4 provided on the non-design face is 1.1 to 50 times (M1×1.1≤M2≤M1×50) as large as upright part cross section area M1. It is preferable that M2 is 1.2 to 20 times, more preferably 1.5 to 5 times as large as M1. The ratio of less than 1.1 times might make skin layer 2 block core layer 3 from flowing through penetration part 4 to upright part. The ratio of more than 50 times might excessively thin the tip of upright part 8 to deteriorate strength, or alternatively make opening area M2 unnecessarily large to narrow the region of skin layer 2 so that rigidity of whole shaped product 7 might not be secured sufficiently.

Figure 8:
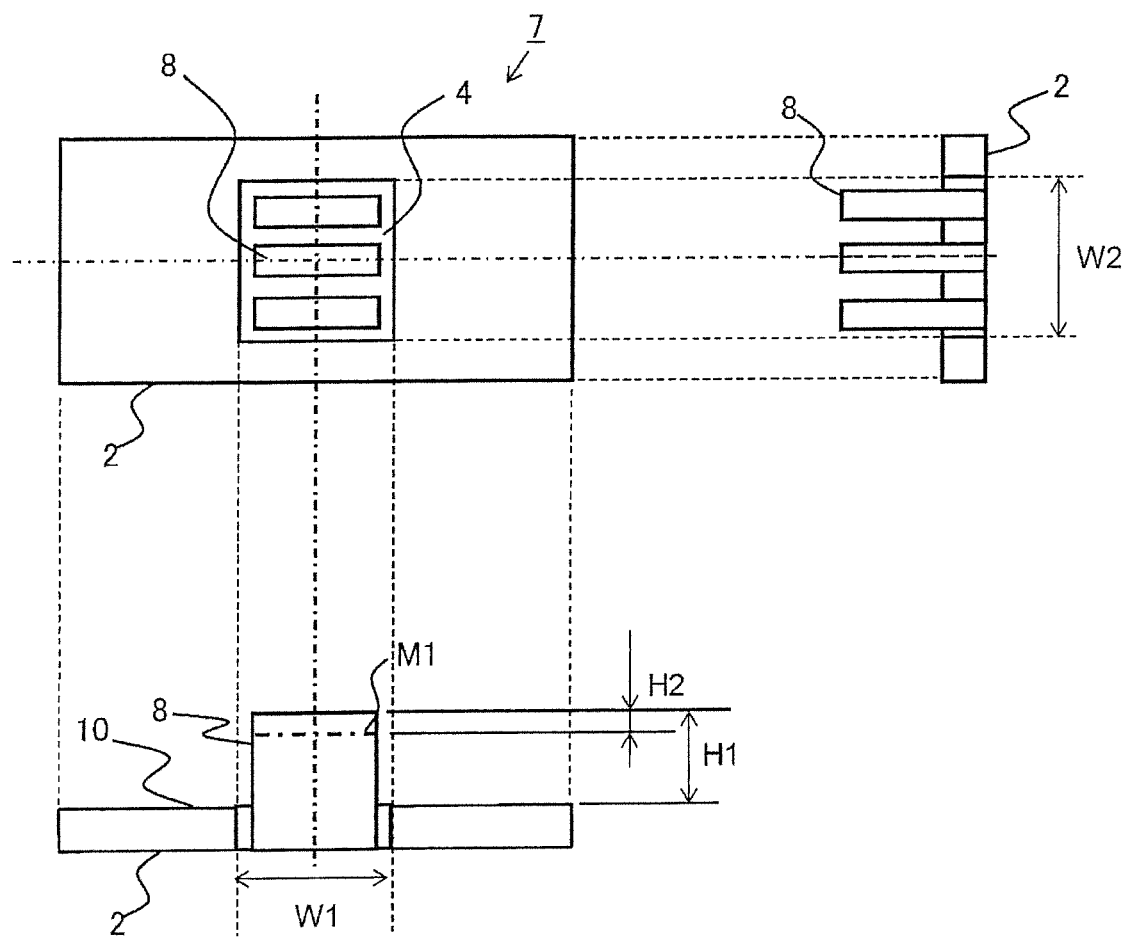
FIG. 8 shows a plan view, right side view and a front cross section view of a sandwich structure provided with three upright parts to a penetration part.

Alternatively, when one penetration part 4 is provided with three upright parts 8 as shown in FIG. 8, it is preferable that opening area M2 is greater than upright part cross section area M1 in total of three upright part cross section areas.

When one penetration part 4 is provided with a plurality of upright parts 8, it is preferable that opening area M2 is 1.1 to 50 times as large as upright part cross section area M1. It is preferable that M2 is 1.2 to 20 times, more preferably 1.3 to 2 times as large as M1. The ratio of less than 1.1 times might make skin layer 2 block core layer 3 from flowing through penetration part 4 to upright part 8. The ratio of more than 50 times might excessively thin the tip of upright part 8 to deteriorate strength, or alternatively make opening area M2 unnecessarily large to narrow the region of skin layer 2 so that rigidity of whole shaped product 7 might not be secured sufficiently.

Hereinafter, production process of sandwich structure 1 and shaped product 7 will be explained.

Sandwich structure 1 can be produced by the following steps: [1] Step of providing penetration part 4 partially on skin layer 2; [2] Step of sandwiching core layer including fluid core layer by skin layers 2 provided with penetration part 4 from both sides to prepare a sandwich precursor; and [3] Step of integrating the sandwich precursor to prepare sandwich structure 1.

Alternatively, sandwich structure 1 can be produced by the following steps: [1] Step of sandwiching core layer 3 including fluid core layer by skin layers 2 from both sides to prepare a sandwich precursor, [2] Step of integrating the sandwich precursor to prepare sandwich structure 1; and [3] Step of providing a penetration part on at least a part on skin layer of sandwich structure 1.

As described above, to form upright part 8 in an out-of-plane direction of sandwich structure 1, it is necessary to produce manufacture sandwich structure body 1 provided with penetration part 4 on at least a part of skin layer 2. Penetration part 4 can be provided in a state of skin layer 2 or sandwich structure 1. In the former case, sandwich structure 1 can be produced provided with penetration part 4 on a part of skin layer 2 by preparing skin layer 2 having penetration part 4 at a predetermined position, sandwiching core layer 3 by skin layers 2 provided with penetration part 4 as at least one side of skin layer 2, and then heating and pressurizing the sandwich precursor to be integrated. In the latter case, sandwich structure 1 can be produced by sandwiching core layer 3 by skin layers 2 to prepare a sandwich precursor, and then heating and pressurizing the sandwich precursor to be integrated. Further, penetration part 4 is added to a predetermined position of skin layer 2 of sandwich structure 1 to produce sandwich structure 1 provided with penetration part 4 at a part of skin layer 2.

Shaped product 7 can be produced by the following steps: [1] Step of providing a penetration part on at least a part of skin layer; [2] Step of sandwiching a core layer including fluid core layer by skin layers provided with the penetration part at least on one side from both sides to prepare a sandwich precursor; [3] Step of placing the sandwich precursor in a forming mold to be closed to integrate the sandwich precursor (to prepare sandwich structure 1) and flowing a fluid core layer through the penetration part into a cavity of forming mold so that the fluid core layer projects in an out-of-plane direction from the skin layer surface to form at least one upright part extending continuously with the fluid core layer.

Figure 9:
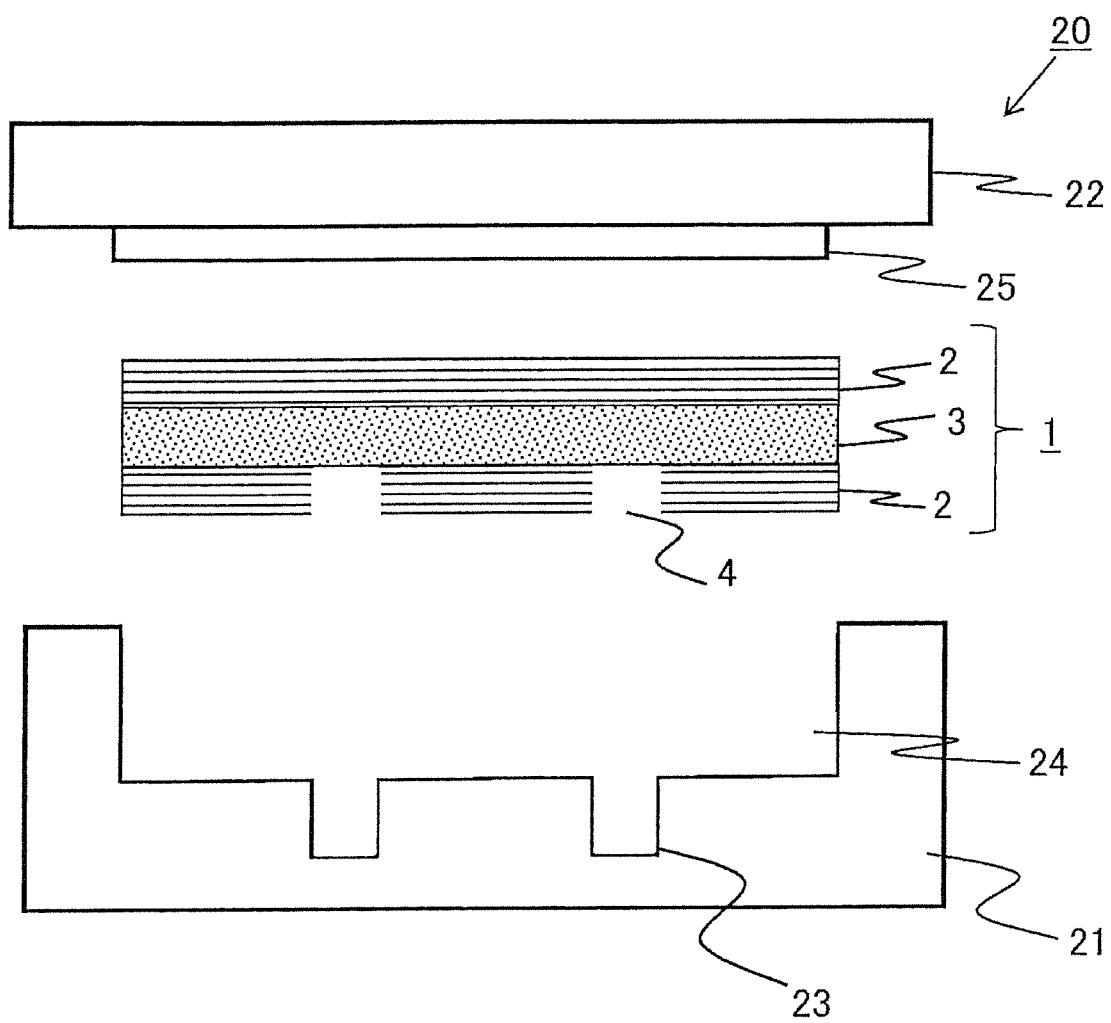
FIG. 9 is a front cross section view of a pair of facing press forming molds used to produce a shaped product having a shape of face plate to be designed and an upright part.

The production process of shaped product 7 will be explained with reference to the drawings. As shown in FIG. 9, a sandwich precursor is formed by stacking skin layer provided with penetration part 4, core layer 3 including fluid core layer consisting of discontinuous fibers and matrix resin (C), and skin layer 2 respectively. The sandwich precursor is placed on depressed part 24 of lower mold 21 so that skin layer 2 provided with penetration part 4 is at the bottom. Penetration part 4 is placed at the same position as groove 23 of lower mold 21. When the region of penetration part 4 is greater than that of groove 23 of lower mold 21, it is preferable that the region of penetration part 4 covers the region of groove 23.

Figure 10:
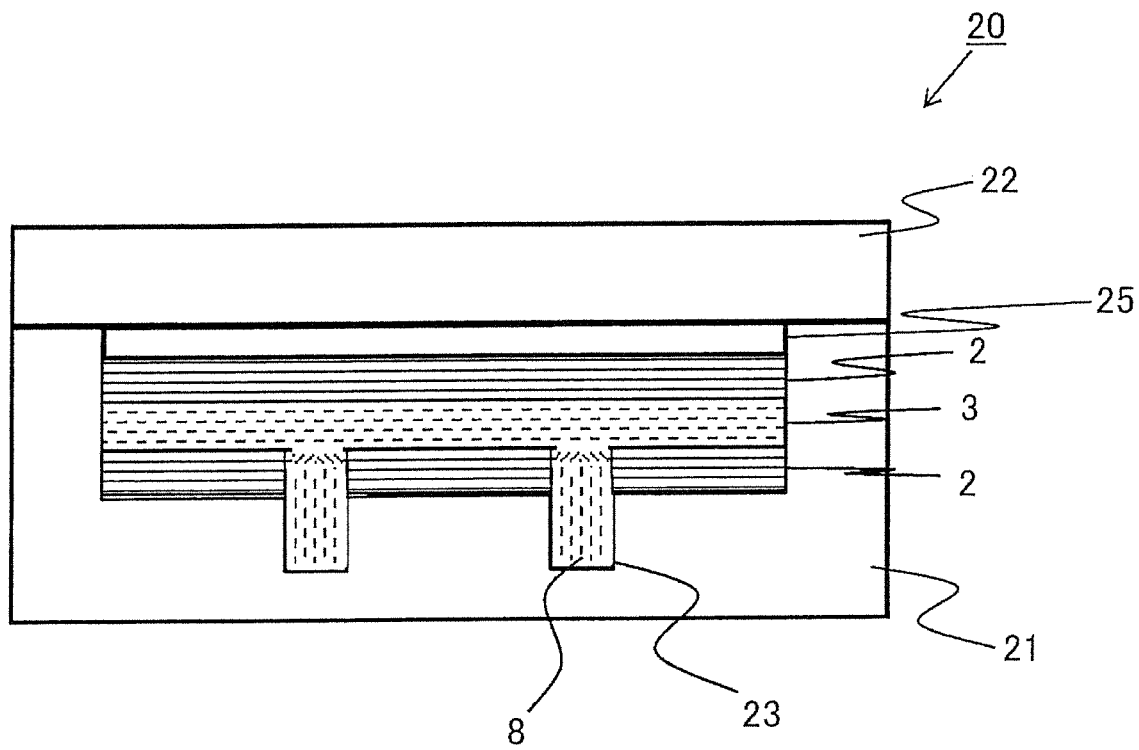
FIG. 10 is a schematic cross section view showing a state in which an upper mold is brought down to pressurize a sandwich structure at a constant surface pressure.

Next, upper mold 22 is lowered to pressurize the sandwich precursor at a constant surface pressure as shown in FIG. 10. Then, sandwich structure 1 is produced by integrating skin layer 2 and core layer 3 by pressurizing although it is not illustrated. The surface pressure is increased to further pressurize it for predetermined time so that a part of fluid core layer flows through provided penetration part 4 into groove 23 to be filled to form upright part 8.

Figure 11:
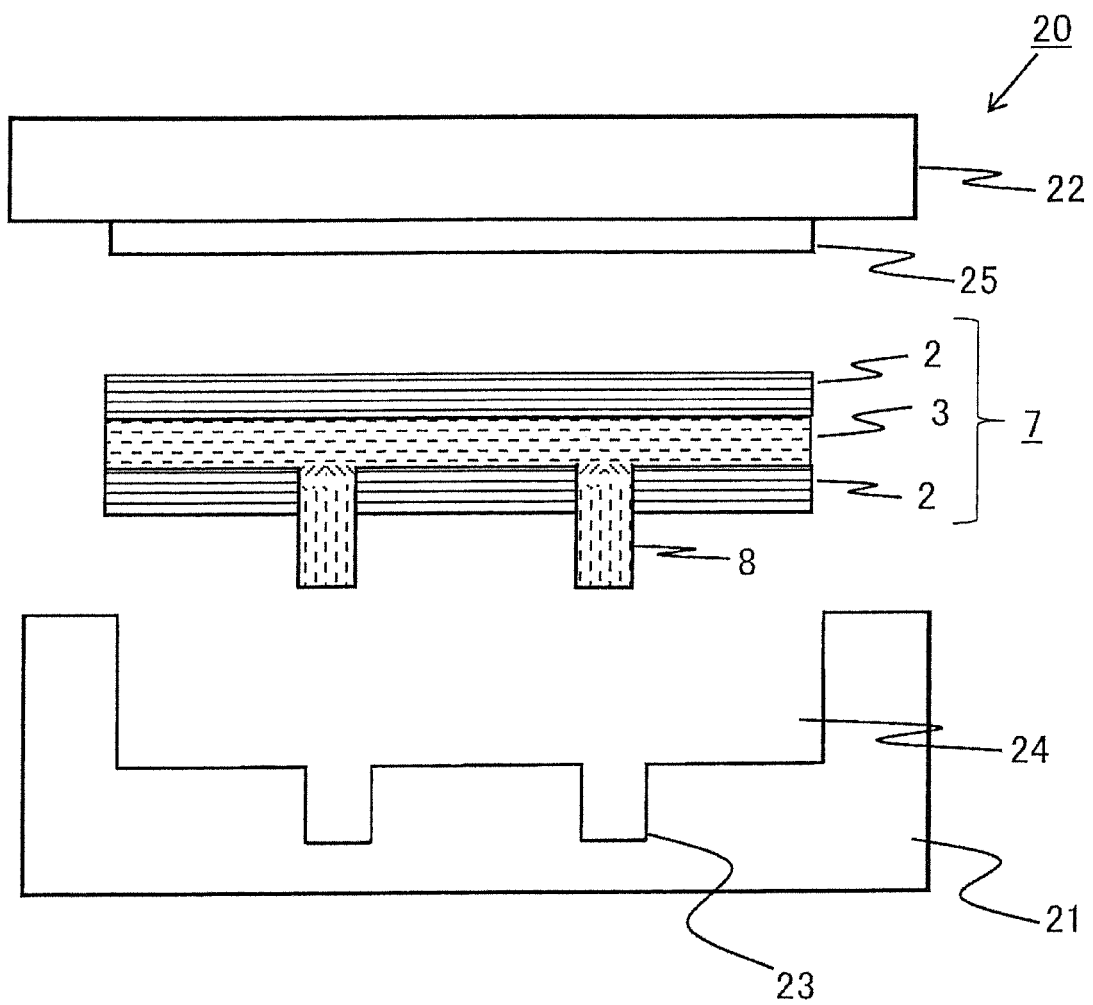
FIG. 11 is a schematic section view showing a state in which an upper mold is opened upward after a press forming to bring a shaped product out.

After press molding, upper mold 11 is opened up to take shaped product 7 out as shown in FIG. 11. Upright part 8 is formed integrally with fluid core layer through penetration part 4 to produce shaped product 7 having a target three-dimensional shape.

To produce the shaped product, sandwich structure 1 prepared by the above-described process and provided with penetration part 4 on at least a part of skin layer 2 is placed in a forming mold to be closed to pressurize sandwich structure 1 so that a part of fluid core layer in sandwich structure 1 flows through penetration part 4 into groove 23 to be filled to form shaped product 7 having at least one upright part 8.

Alternatively, shaped product 7 can be produced by the following steps: [1] Step of providing a penetration part on at least a part of skin layer; [2] Step of sandwiching a core layer including fluid core layer from both sides by skin layers at least one of which is provided with the penetration part to prepare a sandwich precursor; [3] Step of placing the sandwich precursor in a mold and closing the mold to integrate the sandwich precursor into a sandwich structure, and further melting matrix resin in the fluid core layer; and [4] Step of conveying and place the sandwich structure in another forming mold at a temperature regulated below the melting point of matrix resin in the fluid core layer and closing the mold to flow the fluid core layer through the penetration part into a cavity of the forming mold so that the fluid core layer gets upright in an out-of-plane direction from the skin layer surface to form at least one upright part extending continuously with the fluid core layer, and further solidifying matrix resin in the fluid core layer.

To produce a shaped product, the sandwich structure is prepared as described above, in which after skin layer 2 is provided with penetration part 4 at a predetermined position, sandwiching core layer 3 by skin layers 2 at least one of which is provided with penetration part 4 to prepare a sandwich precursor, and further heat and pressurize the sandwich precursor to be integrated to produce sandwich structure 1 having penetration part 4 on at least a part of skin layer 2. The matrix resin of the fluid core layer of sandwich structure 1 is melted by heating at this time. Next, sandwich structure 1 of which matrix resin in the fluid core layer is quickly conveyed and placed in another forming mold at a temperature regulated below the melting point of matrix resin in the fluid core layer, and then the mold is closed. After the mold is closed to pressurize inside for predetermined time, a part of fluid core layer made of melted matrix resin flows through penetration part 4 provided on skin layer 2 into groove 23 to be filled to form upright part 8. Further, after matrix resin in the fluid core layer gradually cooled by the forming mold is solidified, shaped product 7 can be released from the mold. When matrix resin in the fluid core layer is a thermoplastic resin, although it is possible that sandwich structure 1 is placed in a heated forming mold and pressurized after closing the mold to integrate skin layer 2 and core layer 3 as forming upright part 8, the forming cycle might be long by taking time to regulate temperature in the forming mold to be cooled for mold release. However, the forming cycle can be shortened by melting matrix resin in the fluid core layer as described above while forming shaped product with another forming mold at a temperature regulated below the melting point so that skin layer 2 is integrated with core layer 3 while forming upright part 8 and matrix resin in the fluid core layer is solidified for shaped product 7 to be released from the mold.

To integrate the sandwich precursor or form upright part 8, pressurization process may be a process of autoclave forming or press forming.

Because upright part 8 and core layer 3 are continuously formed as integrated in shaped product 7 having a three-dimensional shape provided with upright part 8 produced by the above-described process, shaped product 7 is advantageous to sufficient reinforcement by reinforcing fibers and high mechanical characteristics as well as easy and reliable production process.

EXAMPLES

Hereinafter, our sandwich structure and production process of shaped product will be explained specifically with Examples, although the scope of this disclosure is not limited in particular with the Examples.

Measurement Method of Fiber Mass Content of Forming Material

The fiber mass content of forming material consisting of reinforcing fibers and resin is determined by the following method. A square plate of 100 mm×100 mm×(each thickness) is cut out of the forming material to measure weight w0 [g]. Next, the cut forming material is heated in the air at 500° C. for 1 hour to remove resin component by the burn-out method and weight w1 [g] of remained reinforcing fiber is measured. The fiber mass content (mass %) is calculated by Formula (1). Each measurement is performed three times (n=3) to be averaged.

$$\text{Fiber mass content[mass \%]} = (\text{reinforcing fiber weight } w1/\text{forming material weight } w0) \times 100 \quad (1)$$

Measurement Method of Average Bending Elastic Modulus

A test piece of length 50 mm× width 25 mm (× each thickness) is cut out of the forming material or laminate consisting of the forming material to be measured. The bending elastic modulus is determined according to ASTM D790 at the distance between supporting points of 32 times as thick as test piece. When the forming material and laminate to be measured have anisotropy, the bending elastic modulus is measured in a primary orientation direction of fibers and a direction to rotate by 90° therefrom, and then the measured values are averaged into average bending elastic modulus. When they are isotropic, the bending elastic modulus can be measured in any direction to measure average bending elastic modulus.

Measurement Method of Elongation Rate

The elongation rate of the forming material is determined as follows. First, a measurement sample of disk having diameter of 150 mm is cut out of forming material of which thickness is adjusted to 2 mm. When the resin constituting the forming material is thermosetting resin or the forming material doesn't contain any resin, the sample is set in a pressing mold regulated at 150° C. and formed by pressing at surface pressure of 10 MPa. Alternatively, when the resin constituting the forming material is thermoplastic resin, the sample is placed in an oven with far-infrared heater to be preheated for 10 minutes. The sample is provided with a thermocouple on the surface and the center of the disk to measure a heat history using a multi-input data collection system (made by KEYENCE Corporation, NR-600). After having confirmed that measured temperature is higher by 35° C. than the melting point of the resin itself, the sample is taken out from the oven and set in a pressing mold regulated at a temperature lower by 40° C. than the melting point of the resin itself to be formed by pressing. The press forming is always performed at surface pressure of 10 MPa for 1 minute to prepare a shaped product.

The diameter of the shapes product is measured at any two places and averaged to calculate an area of shaped product. The calculation is performed under a condition that the forming material before forming has diameter of 150 mm. The elongation rate of forming material is calculated by Formula (2).

$$\text{Elongation rate} = (\text{area of forming material before forming}/\text{area of shaped product after forming}) \times 100 \quad (2)$$

Measurement Method of Density

The density of forming material or laminate made from the forming material is determined by the underwater substitution method.

Appearance Quality of Face Plate of Shaped Product

The surface of face plate is visually observed and evaluated according to the following standard. Evaluations A and B mean "passed" while evaluation C means "rejected."

A: Excellent surface appearance without trace like blur and holes on face plate

B: Practically acceptable surface appearance but trace like blur partially on face plate C: Inferior surface appearance with insufficient filling and holes as well as a whole blur on face plate Appearance Quality of Upright Part of Shaped Product The upright part is visually observed and evaluated according to the following standard. From a viewpoint of complete filling of upright part with material, evaluations AA, A and B are "passed" while evaluation C and D are "failed."
AA: Complete filling without resin-rich part and trace of blur
A: Complete filling without resin-rich part and partially with trace of blur
B: Complete filling with some resin-rich part
C: Insufficient filling of 80% or more and less than 100%
D: Insufficient filling of less than 80%
Continuity of Core Layer and Upright Part A small piece including base of upright part is cut out from the shaped product, and is embedded to epoxy resin so that the cross section is polished to prepare a sample. The sample is observed with a laser microscope (VK-9510 made by Keyence Corporation) to confirm whether the upright part is formed continuously with the fluid core layer through the penetration part. When discontinuous fibers are found in the fluid core layer, continuity or discontinuity can be determined by observing fiber orientation. The continuity implies "passed" while the discontinuity implies "failed."

Material Example 1

PAN-based Carbon Fiber Bundle

A polymer primarily composed of polyacrylonitrile was spun and burned to prepare carbon fiber continuous bundle having total filament number of 12,000. A sizing agent was added to the carbon fiber continuous bundle by the dipping method to dry it in heated air to prepare PAN-based carbon fiber bundle. Characteristics of the PAN-based carbon fiber bundle were as follows:
Single fiber diameter: 7 μm
Mass per unit length: 0.83 g/m
Specific gravity: 1.8 g/cm$^3$
Tensile strength: 4.0 GPa
Tensile elastic modulus: 235 GPa
Sizing agent: polyoxyethylene oleyl ether
Sizing agent adhesion: 2 mass %.

Material Example 2

Epoxy Resin

Epoxy resin (base resin: dicyandiamide/dichlorophenyl methylurea curing epoxy resin)

Material Example 3

Non-modified Polypropylene

Non-modified polypropylene (made by Prime Polymer Co., Ltd., "Prime Polypro" (Trademark) J105G, melting point at 160° C.)

Material Example 4

Acid-modified Polypropylene

Acid-modified polypropylene (made by Mitsui Chemicals, Inc., "ADMER" (Trademark) QE510, melting point at 160° C.)

Material Example 5

Adjustment of the Epoxy Resin Film

Epoxy resin in Material Example 2 was applied with a knife coater onto a mold release paper to prepare epoxy resin film.

Material Example 6

Adjustment of Polypropylene Film

Ninety mass % non-modified polypropylene in Material Example 3 and 10 mass % of acid-modified polypropylene in Material Example 4 were dry-blended. The dry-blended product was fed to a twin-screw extruder from a hopper to be melt kneaded and extruded through a T-shape die having 500 mm width. Then, it was taken up with a chill roll at 60° C. to be cooled and solidified to prepare polypropylene film.

Material Example 7

Adjustment of Chopped Carbon Fiber Bundle

The PAN-based carbon fiber bundle in Material Example 1 was cut with a cartridge cutter to prepare chopped carbon fiber bundle having fiber length of 9 mm.

Material Example 8

Adjustment of Milled Carbon Fiber

The PAN-based carbon fiber bundle in Material Example 1 was made into a short fiber to prepare milled carbon fiber.

Material Example 9

Chopped Glass Fiber Bundle

Chopped glass fiber bundle (made by Nitto Boseki Co., Ltd., product name CS13G-874, single fiber diameter: 10 μm, specific gravity: 2.5 g/cm$^3$, fiber length: 13 mm (catalogue value))

Material Example 10

Adjustment of Glass Fiber Mat

A foamed dispersion liquid was prepared by stirring 100 liters of 1.5 mass % water solution of surfactant ("n-dodecyl benzene sulfonic acid sodium" (product name) made by Wako Pure Chemical Industries, Ltd.). The chopped glass fiber bundles prepared in Material Example 9 was added to the dispersion liquid to be stirred for 10 minutes and then poured into a paper machine having a papermaking surface of 500 mm length×500 mm width, which was dehydrated by suction and dried at 150° C. for 2 hours to produce a glass fiber mat made of glass fiber.

Material Example 11

Unidirectional Carbon Fiber Reinforced Sheet A

After the PAN-based carbon fiber bundles were disposed along a direction to make a sheet, two pieces of the epoxy resin film prepared in Material Example 5 were stacked from both faces of the sheet of carbon fiber bundle, which was impregnated with resin by heating and pressurizing to produce unidirectional carbon fiber reinforced sheet A which was named "forming material S-1" made of carbon fiber and epoxy resin and had length of 500 mm, width of 500 mm, thickness of 0.15 mm and fiber mass content of 70 mass %. Table 1 shows material constitutions and characteristics of forming materials.

Material Example 13

Woven Carbon Fiber Reinforced Sheet

After the PAN-based carbon fiber bundles were made plain-woven to make a sheet, two pieces of the epoxy resin film prepared in Material Example 5 were stacked from both faces of the sheet of carbon fiber bundle, which was impregnated with resin by heating and pressurizing to produce woven carbon fiber reinforced sheet which was named "forming material S-3" made of carbon fiber and epoxy resin and had length of 500 mm, width of 500 mm, thickness of 0.3 mm and fiber mass content of 55 mass %.

Material Example 14

SMC Sheet

The epoxy resin film prepared in Material Example 5 was placed on a mold release sheet (Teflon (registered trademark), thickness 1 mm) placed on a metal tool plate. The chopped carbon fiber bundles in Material Example 7 were randomly dispersed on the epoxy film, and the random directional distribution of chopped carbon fiber bundle was visually observed. Further on it, the epoxy resin film, mold

TABLE 1

| | | | Forming material S-1 | Forming material S-2 | Forming material S-3 | Forming material S-4 | Forming material S-5 | Forming material K-6 |
|---|---|---|---|---|---|---|---|---|
| Material constitution | Material name | — | Unidirectional carbon fiber reinforced sheet A | Unidirectional carbon fiber reinforced sheet B | Woven carbon fiber reinforced sheet | SMC sheet | Aluminium foil | Short fiber reinforced resin sheet A |
| | Reinforcing fiber | Kind | Carbon fiber | Carbon fiber | Carbon fiber | Carbon fiber | — | Carbon fiber |
| | | Continuous or discontinuous | Continuous | Continuous | Continuous | Discontinuous | — | Discontinuous |
| | | Form | Unidirectional material | Unidirectional material | Woven fabric | Randomly-orientated mat | — | Monofilament |
| | Resin | Kind | Epoxy Resin | Polypropylene Resin | Epoxy Resin | Epoxy Resin | — | Epoxy Resin |
| | Forming material | Fiber mass content of reinforcing fiber | mass % | 70 | 55 | 55 | 50 | 0 | 25 |
| Characteristics | | Thickness | mm | 0.15 | 0.1 | 0.3 | 0.3 | 0.15 | 0.2 |
| | | Average bending elastic modulus | GPa | 68 | 40 | 47 | 30 | 60 | 16 |
| | | Elongation rate | % | 110 | 120 | 110 | 200 | 100 | 450 |
| | | Density | g/cm$^3$ | 1.6 | 1.2 | 1.5 | 1.5 | 2.7 | 1.3 |

| | | | Forming material K-7 | Forming material S-8 | Forming material K-9 | Forming material S-10 | Forming material K-11 |
|---|---|---|---|---|---|---|---|
| Material constitution | Material name | — | Short fiber reinforced resin sheet B | Short fiber reinforced resin sheet C | Polypropylene Sheet | Short fiber reinforced resin sheet D | Short fiber reinforced resin sheet E |
| | Reinforcing fiber | Kind | Carbon fiber | Glass fiber | — | Glass fiber | Glass fiber |
| | | Continuous or discontinuous | Discontinuous | Discontinuous | — | Discontinuous | Discontinuous |
| | | Form | Monofilament | Monofilament | — | Monofilament | Monofilament |
| | Resin | Kind | Polypropylene Resin | Epoxy Resin | Polypropylene Resin | Polypropylene Resin | Epoxy Resin |
| | Forming material | Fiber mass content of reinforcing fiber | mass % | 30 | 55 | 0 | 60 | 35 |
| Characteristics | | Thickness | mm | 0.2 | 0.3 | 0.2 | 0.3 | 0.2 |
| | | Average bending elastic modulus | GPa | 14 | 10 | 2 | 9 | 6 |
| | | Elongation rate | % | 400 | 180 | 900 | 200 | 220 |
| | | Density | g/cm$^3$ | 1.1 | 1.5 | 0.9 | 1.5 | 1.5 |

Material Example 12

Unidirectional Carbon Fiber Reinforced Sheet B

After the PAN-based carbon fiber bundles were disposed along a direction to make a sheet, two pieces of the polypropylene film prepared in Material Example 6 were stacked from both faces of the sheet of carbon fiber bundle, which was impregnated with resin by heating and pressurizing and subjected to cold pressing to produce unidirectional carbon fiber reinforced sheet B which was named "forming material S-2" made of carbon fiber and polypropylene and had length of 500 mm, width of 500 mm, thickness of 0.1 mm and fiber mass content of 55 mass %.

release sheet and tool plate prepared in Material Example 5 were stacked in this order. And then it was impregnated with resin by heating and pressurizing to produce an SMC sheet, which was named "forming material S-4" made of carbon fiber and epoxy resin and had length of 500 mm, width of 500 mm, thickness of 0.3 mm and fiber mass content of 50 mass %.

Material Example 15

Aluminum Foil

Aluminum foil (made by UACJ Foil Corporation, 150 μm thickness) was named "forming material S-5."

Material Example 16

Short Fiber Reinforced Resin Sheet A

The epoxy resin in Material Example 2 and the milled carbon fibers in Material Example 8 were blended and made into a sheet to produce short fiber reinforced resin sheet A which was named "forming material K-6)."

Material Example 17

Short Fiber Reinforced Resin Sheet B

In the same manner as Material Example 6, the non-modified polypropylene resin in Material Example 3 of 90 mass % and the acid-modified polypropylene resin in Material Example 4 of 10 mass % were dry-blended. The dry-blended product was fed to a twin-screw extruder from a hopper to be melt kneaded, and then the chopped carbon fiber bundles prepared in Material Example 7 were fed to it and further kneaded. And it was extruded through a T-shape die having 500 mm width. Afterwards it was taken up with a chill roll at 60° C. to be cooled and solidified to prepare short fiber reinforced sheet B which was named "forming material K-7" and had thickness of 0.2 mm.

Material Example 18

Short Fiber Reinforced Resin Sheet C

The glass fiber mat prepared in Material Example 10 was sandwiched by the and the epoxy resin film prepared in Material Example 5, which was impregnated with resin by heating and pressurizing to produce short carbon fiber reinforced sheet C which was named "forming material S-8" made of glass fiber and epoxy resin and had length of 500 mm, width of 500 mm, thickness of 0.3 mm and fiber mass content of 55 mass %.

Material Example 19

Polypropylene Sheet

In the same manner as Material Example 6, polypropylene sheet which was named "forming material K-9" and had length of 500 mm, width of 500 mm and thickness of 0.2 mm was prepared.

Material Example 20

Short Fiber Reinforced Resin Sheet D

In the same manner as Material Example 18, short fiber reinforced resin sheet D, which was named "forming material S-10" and had length of 500 mm, width of 500 mm, thickness of 0.3 mm and fiber mass content of 60 mass %, was prepared by using materials in Material Example 10 and Material Example 6.

Material Example 21

Short Fiber Reinforced Resin Sheet E

In the same manner as Material Example 18, short fiber reinforced resin sheet E, which was named "forming material S-11" and had length of 500 mm, width of 500 mm, thickness of 0.2 mm and fiber mass content of 35 mass %, was prepared by using materials in Material Example 10 and Material Example 5.

Material Example 22

Figure 12:
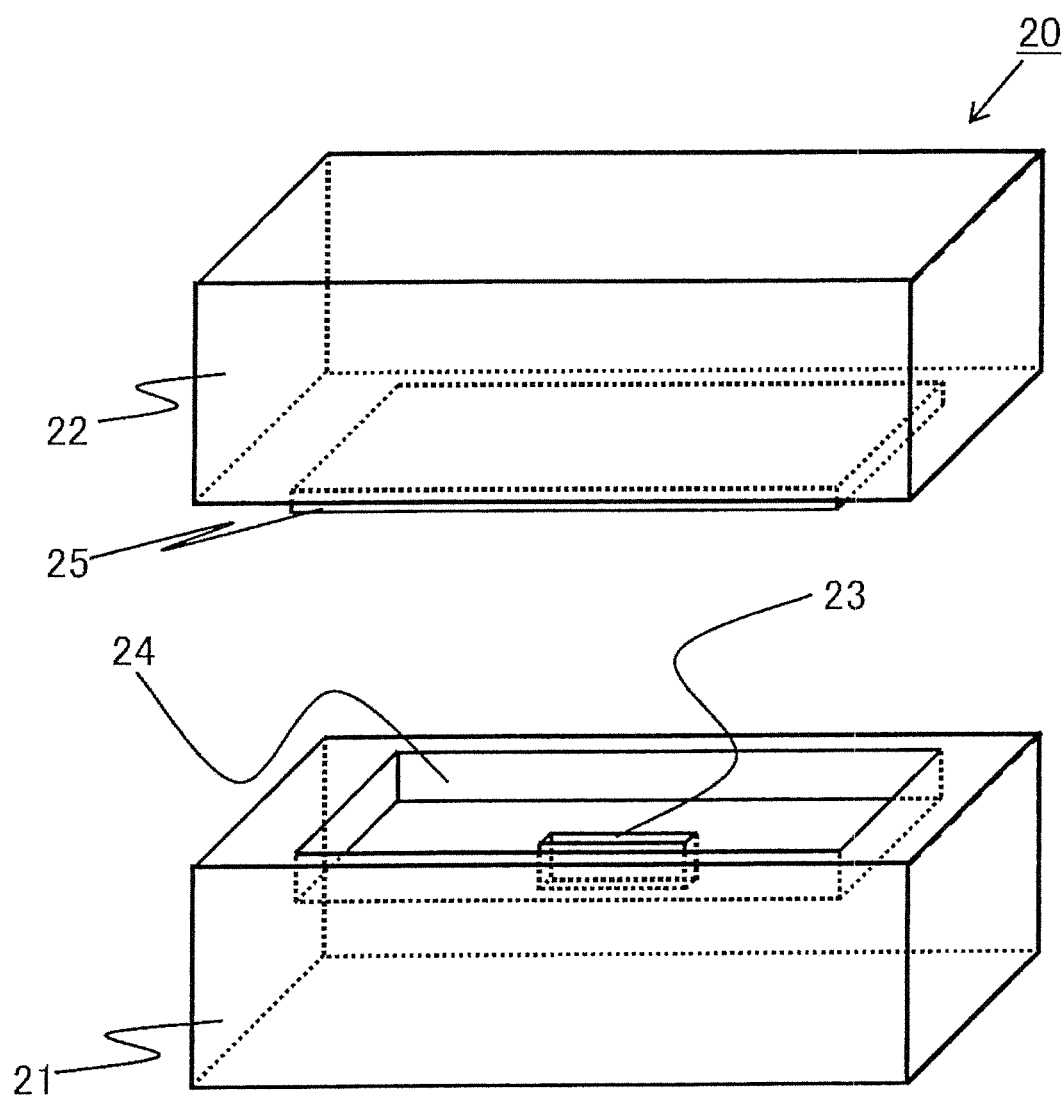
FIG. 12 is a perspective view of a pair of opposed molds.
Figure 13:
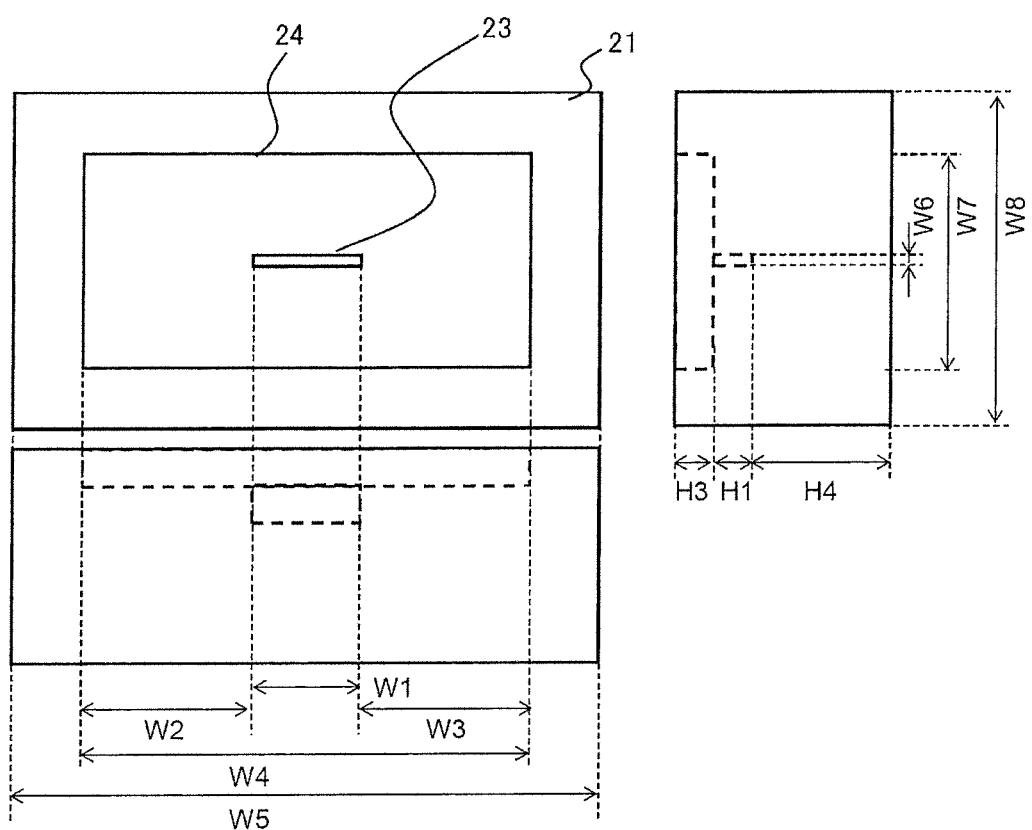
FIG. 13 shows a plan view, front cross section view and right side cross section view of upper mold (open mold).
Figure 14:
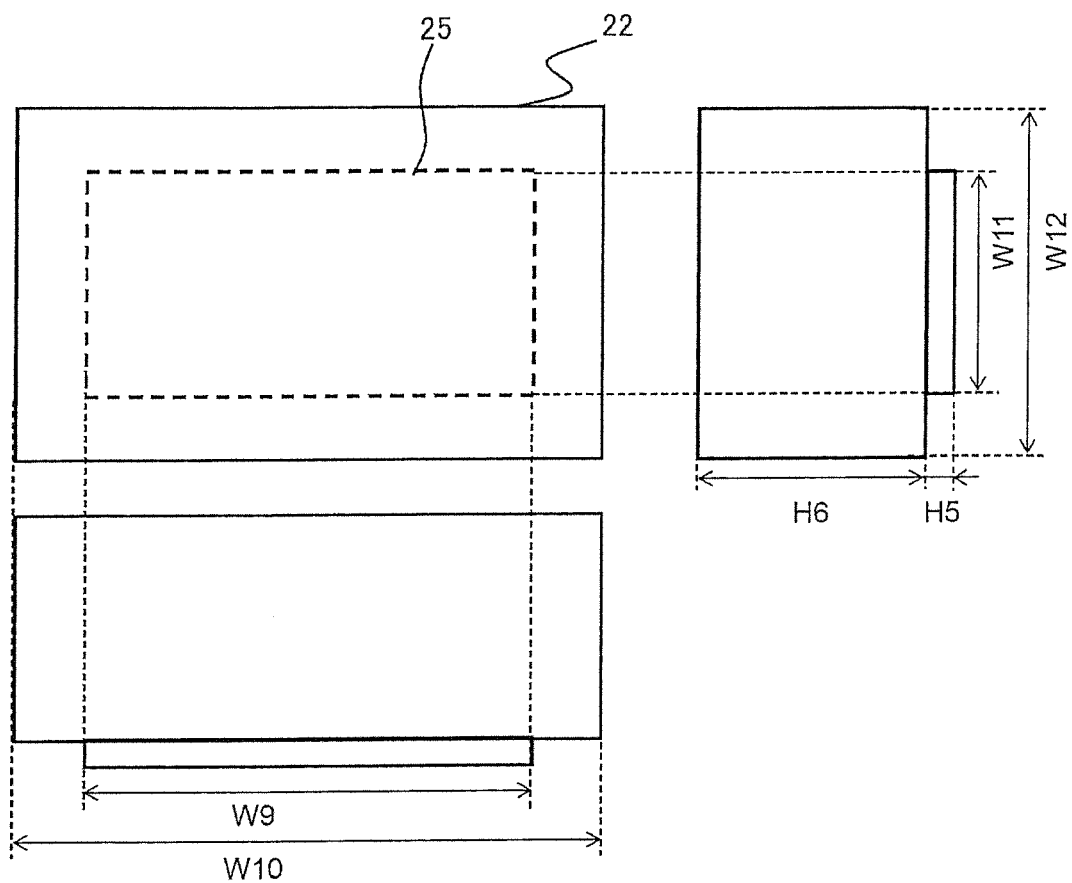
FIG. 14 shows a plan view, front cross section view and right side cross section view of lower mold (opposed mold).

FIG. 12 shows a perspective view of a pair of opposed molds 20 used to prepare a shaped product having a shape composed of face plate and rib as a straight lined upright part. Depressed part 24 is provided on a surface of lower mold 21 opposite upper mold 22, in which groove 23 to form upright part 8 is formed. Protruding part 25 used to pressurize sandwich structure 1 (or sandwich precursor) is provided on a surface of upper mold opposite lower mold 21. FIG. 13 shows a position relation between groove 23 and depressed part 24 provided on lower mold 21. FIG. 14 shows a position relation of protruding part 25 provided on upper mold 22. In the drawing, symbols W and H indicate each length or depth. Concrete dimensions are as follows:
FIG. 13: W1; 30 mm, W2; 185 mm, W3; 185 mm, W4; 400 mm, W5; 500 mm, W6; 2 mm, W7; 200 mm, W8; 300 mm, H1; 10 mm, H3; 10 mm, H4; 120 mm
FIG. 14: W9; 399.8 mm, W10; 500 mm, W11; 199.8 mm, W12; 300 mm, H5; 9 mm, H6; 150 mm.

Material Example 23

Figure 15:
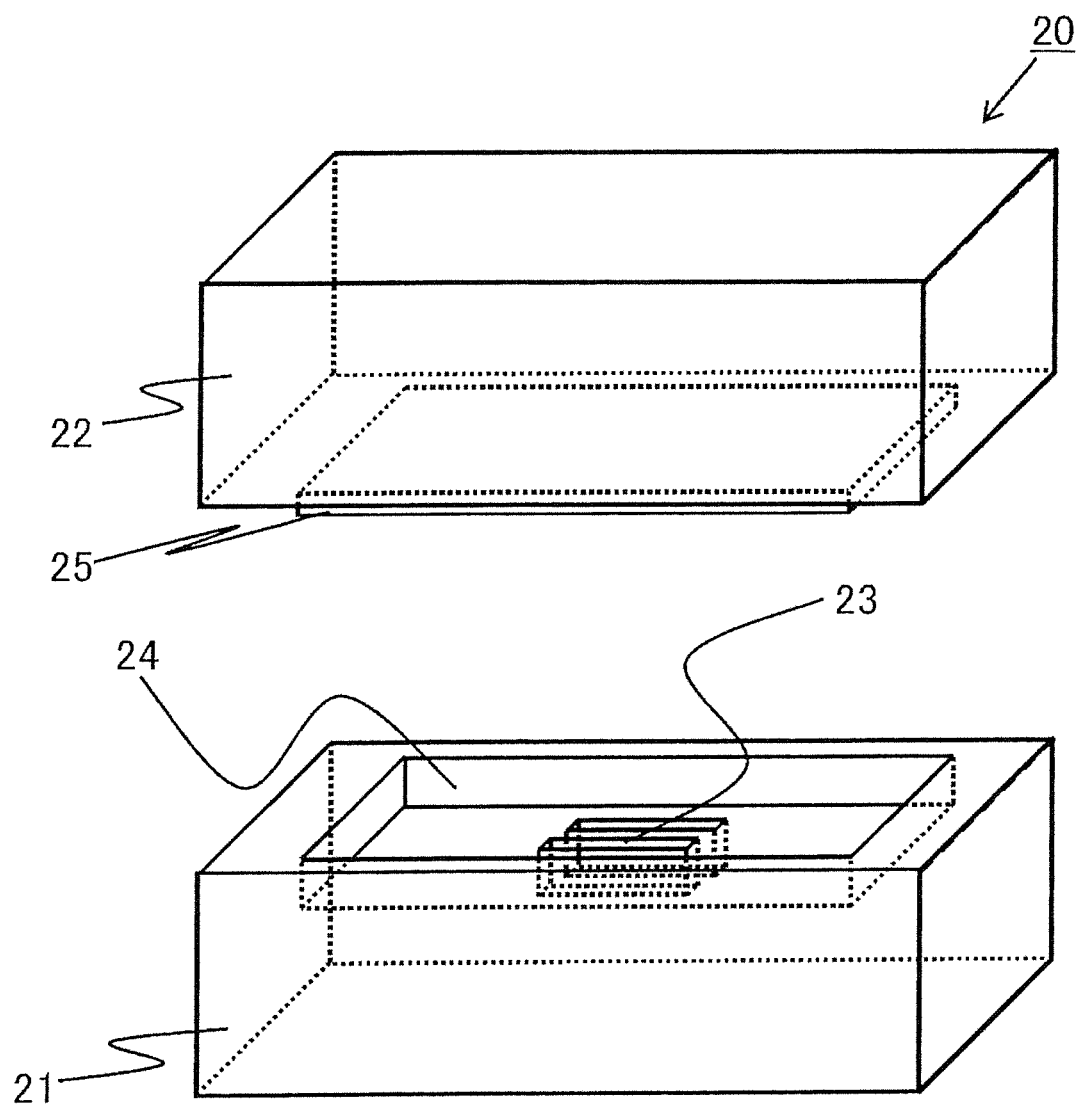
FIG. 15 is a perspective view of a pair of opposed molds having two neighboring grooves.
Figure 16:
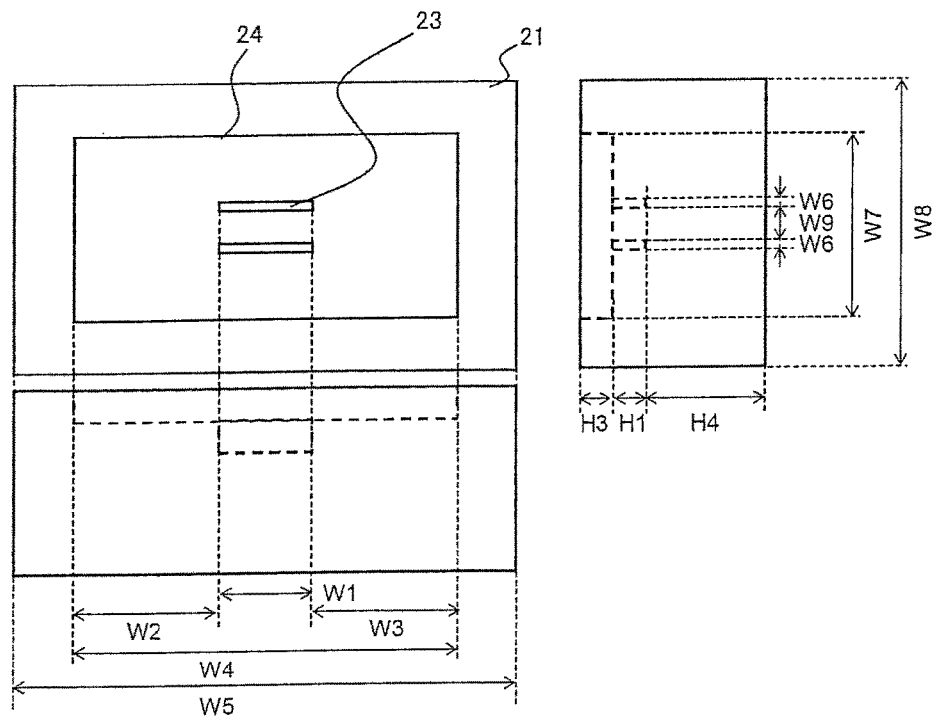
FIG. 16 shows a plan view, front cross section view and right side cross section view of an upper mold (open mold) having two neighboring grooves.

FIG. 15 shows a perspective view of a pair of opposed molds 20 used to prepare a shaped product having a shape composed of face plate and ribs as two adjacent straight lined upright part. Depressed part 24 is provided on a surface of lower mold 21 opposite upper mold 22, in which groove 23 to form upright part 8 is formed. Protruding part 25 used for pressurizing sandwich structure 1 (or sandwich precursor) is provided on a surface of upper mold opposite lower mold 21. FIG. 16 shows a position relation of protruding part 25 provided on upper mold 22. The position relation of protruding part 25 provided on upper mold 22 has the same dimensions. In the drawing, symbols W and H indicate each length or depth. Concrete dimensions are as follows:
FIG. 16: W1; 30 mm, W2; 185 mm, W3; 185 mm, W4; 400 mm, W5; 500 mm, W6; 2 mm, W7; 200 mm, W8; 300 mm, W9; 6 mm, H1; 10 mm, H3; 10 mm, H4; 120 mm.

Example 1

Figure 17:
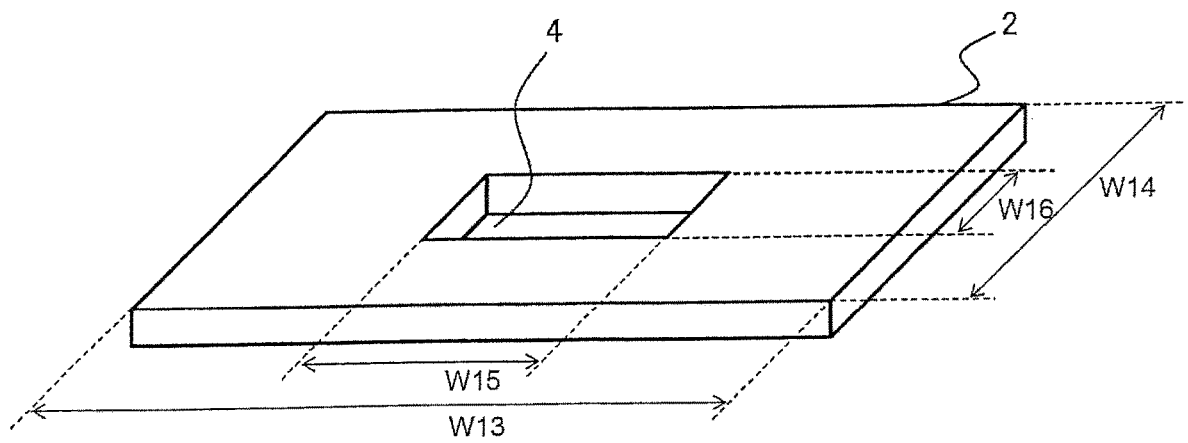
FIG. 17 is a perspective view showing size and shape of skin layer employed in Examples.

A skin layer (with penetration part: forming material S-1-1, without penetration part: forming material S-1-2) of forming material S-1 shown in Material Example 11 and a core layer of forming material K-6 shown in Material Example 16 were cut according to the following dimensions. The penetration part formed on forming material S-1-1 had dimensions and shapes shown in FIG. 17.
Forming material S-1-1 (with penetration part) W13; 400 mm, W14; 200 mm, W15; 50 mm, W16; 15 mm Forming material S-1-2 (without penetration part), forming material K-1 (without penetration part), W13; 400 mm, W14; 200 mm Next, a sandwich precursor was prepared by laminating the forming materials in order of [forming material S-1-2 (0°)/forming material S-1-2 (90°)/forming material K-6/forming material K-6/forming material K-6/forming material S-1-1 (90°)/forming material S-1-1 (0°)]. Orientation angles of reinforcing fiber are indicated in the parenthesis.

The forming mold shown in Material Example 22 was regulated at 150° C. The prepared sandwich precursor was placed in a depressed part of lower mold so that forming material S-1-1 was directed downward to confirm that the penetration part of forming material S-1-1 was placed at a groove of lower mold. Next, the upper mold was lowered to pressurize it at surface pressure of 1 MPa for 2 minutes to produce sandwich structure 1 by integrating the forming materials. The surface pressure was increased to 15 MPa to further pressurize it for 6 minutes, and the upper mold was elevated to prepare a shaped product.

Thus prepared shaped product had an excellent surface appearance without trace like blur and holes. The upright part formed in a region of penetration part of forming material S-1-1 was filled with materials without resin-rich part and blur. The upright part was formed continuously with the fluid core layer through the penetration part. Table 2 shows evaluation results.

TABLE 2

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Forming material | | Skin layer | Forming material S-1 | Forming material S-2 | Forming material S-3 | Forming material S-4 | Forming material S-5 | Forming material S-1 | Forming material S-4 | Forming material S-3 | Forming material S-1 | Forming material S-1 |
| | Core layer | Fluid core layer | Forming material K-6 | Forming material K-6 | Forming material K-6 | Forming material K-6 | Forming material K-6 | Forming material K-6 | Forming material K-6 | Forming material K-6 Forming material K-9 | Forming material K-11 | Forming material K-7 |
| | | Light weight core layer | — | — | — | — | — | — | — | — | — | — |
| Sandwich precursor | Size | W13 [mm] | 400 | 400 | 400 | 400 | 400 | 400 | 400 | 400 | 400 | 400 |
| | | W14 [mm] | 200 | 200 | 200 | 200 | 200 | 200 | 200 | 200 | 200 | 200 |
| | Lamination | 1st layer (design face side) | Forming material S-1-2 (0 deg) | Alternately laminated plate S-2-2 (0/90/0 deg) | Forming material S-3-2 | Forming material S-4-2 | Forming material S-5-2 | Forming material S-1-2 (0 deg) | Forming material S-4-2 | Forming material S-3-1 | Forming material S-1-1 (0 deg) | Forming material S-1-2 (0 deg) |
| | | 2nd layer | Forming material S-1-2 (90 deg) | Forming material K-6 (3 pieces) | Forming material K-6 (3 pieces) | Forming material K-6 (3 pieces) | Forming material K-6 (3 pieces) | Forming material S-1-2 (90 deg) | Forming material K-6 (3 pieces) | Forming material K-9-1 | Forming material S-1-1 (90 deg) | Forming material S-1-2 (90 deg) |
| | | 3rd layer | Forming material K-6 (3 pieces) | Alternately laminated plate S-2-2 | Forming material S-3-1 | Forming material S-4-1 | Forming material S-5-1 | Forming material K-6 (3 pieces) | Forming material S-4-3 | Forming material K-6 (3 pieces) | Forming material K-11 (3 pieces) | Forming material K-7 (3 pieces) |
| | | 5th layer | Forming material S-1-1 (0 deg) | | | | | Forming material S-1-3 (0 deg) | | Forming material S-3-1 | Forming material S-1-1 (0 deg) | Forming material S-1-1 (0 deg) |
| Forming | Penetration part | Treatment layer of penetrating part | 4th, 5th layers | 3rd layer | 3rd layer | 3rd layer | 3rd layer | 4th, 5th layers | 3rd layer | 1st, 2nd, 4th, 5th layers | 1st, 2nd, 4th, 5th layers | 3rd layer |
| | | Penetration part at design face side opposite to penetration part at non-design face side | None | None | None | None | None | None | None | None | None | None |
| | Shape | Size of penetration part W15 [mm] | 50 | 50 | 50 | 50 | 50 | 10 | 10 | 50 | 50 | 50 |
| | | W16 [mm] | 15 | 15 | 15 | 15 | 20 | 40 | 40 | 15 | 15 | 15 |
| | | Mold shape | Material example 22 | Material example 22 | Material example 22 | Material example 22 | Material example 23 | Material example 22 | Material example 22 | Material example 22 | Material example 22 | Material example 22 |
| | | The number of upright parts per one penetration part | One | One | One | One | One | One | One | One | One | One |
| | | Area ratio of penetration part opening to upright part cross section | 12.5 | 12.5 | 12.5 | 12.5 | 8.3 | 6.7 | 6.7 | 12.5 | 12.5 | 12.5 |
| Shaped product | Evaluation result | Face plate Appearance quality | A | A | A | A | A | A | A | A | A | A |
| | | Upright part Appearance quality | A | A | A | A | A | B | B | A | A | A |
| | | Cross section state (continuity between fluid core layer and upright part) | Continuous | Continuous | Continuous | Continuous | Continuous | Continuous | Continuous | Continuous | Continuous | Continuous |

Comparative Example 1

After a sandwich precursor was prepared with the forming material shown in Table 3 in the same manner as Example 1, the same forming mold of Material Example 22 as Example 1 was regulated at 150° C. and the sandwich precursor placed in the depressed part of lower mold and then the upper mold was lowered for press forming to prepare a shaped product in the same condition as Example 1.

The appearance quality of face plate was good. However, the upright part was filled with resin by about 10% only, because the skin layer was not provided with a penetration part although the resin in the skin layer flowed into a part of the upright part. Further, the upright part had low strength because it was filled with resin only. Table 3 shows evaluation results.

The same forming mold of Material Example 22 as Example 1 was regulated at 155° C. and the sandwich precursor placed in the depressed part of lower mold and then the upper mold was lowered for pressurizing at 15 MPa for 7 minutes to prepare a shaped product. The evaluation of thus prepared shaped product was good as shown in Table 2.

Example 3

After a sandwich precursor was prepared with the forming material shown in Table 2 in the same manner as Example 1, the same forming mold of Material Example 22 as Example 1 was regulated at 150° C. and the sandwich precursor placed in the depressed part of lower mold and then the upper mold was lowered for press forming to

TABLE 3

| | | | Comparative Example 1 | Comparative Example 2 | Comparative Example 3 | Comparative Example 4 |
|---|---|---|---|---|---|---|
| Forming material | | The skin layer | Forming material S-1 | Forming material S-10 | Forming material S-8 | Forming material S-4 |
| | Core layer | Fluid core layer | Forming material K-6 | Forming material K-7 | Forming material K-6 | Forming material K-6 |
| | | Lightweight core layer | — | — | — | — |
| | Size | W13 [mm] | 400 | 400 | 400 | 400 |
| | | W14 [mm] | 200 | 200 | 200 | 200 |
| Sandwich precursor | Lamination | 1st layer (design face side) | Forming material S-1-2 (0 deg) | Forming material S-10 | Forming material S-8-2 | Forming material S-4-2 |
| | | 2nd layer | Forming material S-1-2 (90 deg) | Forming material K-7 (3 pieces) | Forming material K-6 (3 pieces) | Forming material K-6 (3 pieces) |
| | | 3rd layer | Forming material K-6 (3 pieces) | Forming material S-10 | Forming material S-8-1 | Forming material S-4-2 |
| | | 4th layer | Forming material S-1-2 (90 deg) | | | |
| | | 5th layer | Forming material S-1-2 (0 deg) | | | |
| | Penetration part | Treatment layer of penetrating part | None | None | None | None |
| | | Penetration part at design face side opposite to penetration part at non-design face side | None | None | None | None |
| | | Size of penetration part W15 [mm] | — | — | — | — |
| | | W16 [mm] | — | — | — | — |
| Forming | Shape | Mold shape | Material example 22 | Material example 22 | Material example 22 | Material example 22 |
| | | The number of upright parts per one penetration part | — | — | — | — |
| | | Area ratio of penetration part opening to upright part cross section | — | — | — | — |
| Shaped product | Evaluation result | Face plate Appearance quality | A | A | A | A |
| | | Upright part Appearance quality | D | A | D | D |
| | | Cross section state (continuity between fluid core layer and upright part) | — | Continuous | Continuous | Continuous |

Example 2

Figure 18:
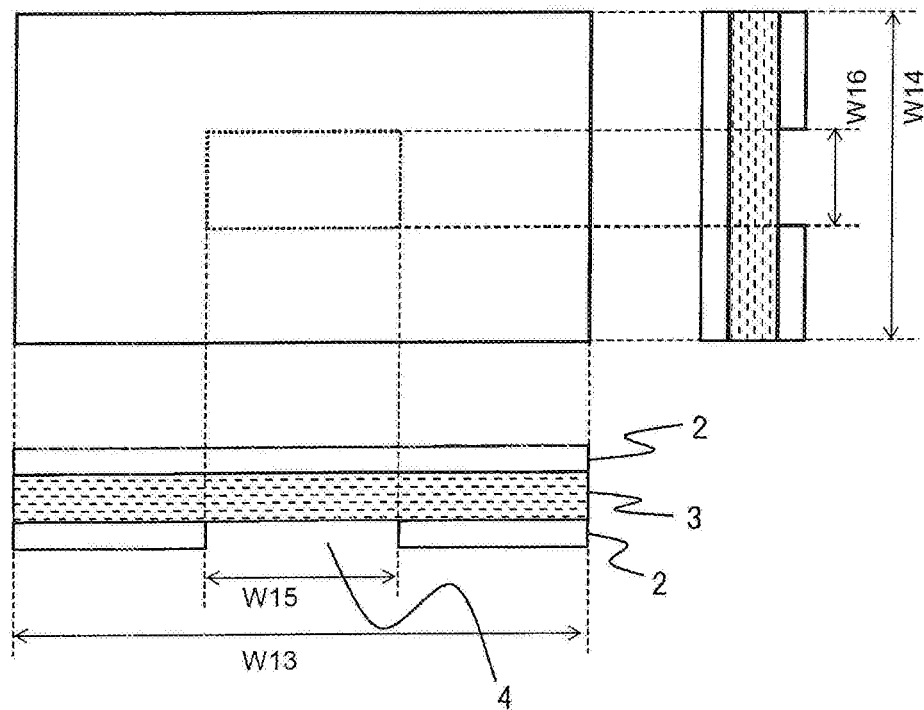
FIG. 18 shows a plan view, front cross section view and side cross section view of a sandwich precursor employed in Examples.

The forming materials shown in Table 2 were used. Forming material S-2 cut into 400 mm×200 mm was laminated in order of [forming material S-2 (0°)/forming material S-2 (90°)/forming material S-2 (0°)] and intermittently pressed with a press forming machine between heating and cooling to prepare an alternately laminated plate S-2-2 (without penetration part). In the same manner as Example 1, a penetration part having the dimension shown in Table 2 was provided on alternately laminated plate S-2-2 to prepare alternately laminated plate S-2-1 (with penetration part). Then, forming materials including forming material K-6 cut into the dimension shown in Table 2 were laminated in the order shown in Table 2 in the same manner as Example 1 to prepare a sandwich precursor as shown in FIG. 18.

prepare a shaped product in the same manner as Example 1. The evaluation of thus prepared shaped product was good as shown in Table 2.

Example 4

After a sandwich precursor was prepared with the forming material shown in Table 2 in the same manner as Example 1, the same forming mold of Material Example 22 as Example 1 was regulated at 150° C. and the sandwich precursor placed in the depressed part of lower mold and then the upper mold was lowered for press forming to prepare a shaped product in the same manner as Example 1. The evaluation of thus prepared shaped product was good as shown in Table 2.

Example 5

With forming materials shown in Table 2, a skin layer (with penetration part: forming material S-5-1, without penetration part: forming material S-5-2) of forming material S-5 and a core layer of forming material K-6 were cut according to the following dimensions. The penetration part formed on forming material S-1-1 had dimensions and shapes shown in FIG. 17.

Forming material S-5-1 (with penetration part): W13; 400 mm, W14; 200 mm, W15; 50 mm, W16; 20 mm Forming material S-5-2 (without penetration part), forming material K-6 (without penetration part): W13; 400 mm, W14; 200 mm After a sandwich precursor was prepared in the lamination shown in Table 2 in the same manner as Example 1, the forming mold of Material Example 22 was regulated at 150° C. and the sandwich precursor placed in a depressed part of lower mold so that forming material S-5-1 (with penetration part) was directed downward to confirm that a region of the penetration part of forming material S-5-1 was placed at a position covering two grooves of the lower mold. Next, the upper mold was lowered to pressurize it at surface pressure of 1 MPa for 2 minutes to produce sandwich structure 1 by integrating the forming materials. The surface pressure was increased to 15 MPa to further pressurize it for 6 minutes, and the upper mold elevated to prepare a shaped product. Thus prepared shaped product had an excellent surface appearance without trace like blur and holes. The two upright parts formed in a region of penetration part of forming material S-1-1 were filled completely with materials without resin-rich part and blur. The two upright parts were formed continuously with the fluid core layer through the penetration part. The evaluation of thus prepared shaped product was good as shown in Table 2.

Example 6

The forming materials shown in Table 2 were used. After a sandwich precursor was prepared in the same manner as Example 1 except that the penetration part had a smaller area, the same forming mold of Material Example 22 as Example 1 was regulated at 150° C. and the sandwich precursor placed in the depressed part of lower mold and then the upper mold was lowered for press forming to prepare a shaped product in the same manner as Example 1.

Figure 19:
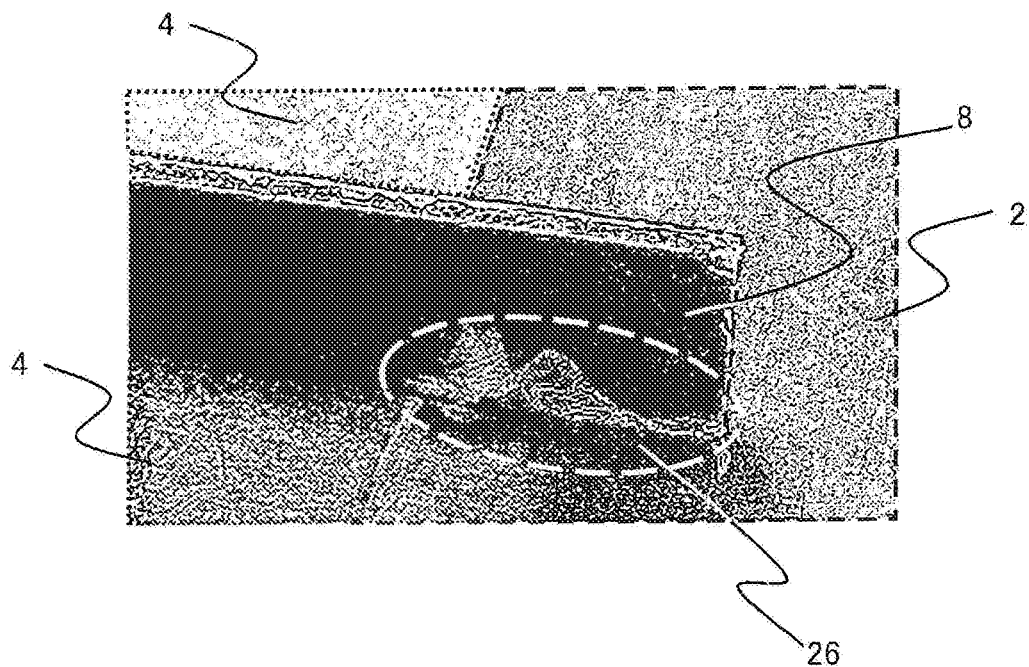
FIG. 19 shows appearance of base of upright part of shaped product obtained in Example 6.

Thus prepared shaped product had an excellent surface appearance without trace like blur and holes. The upright part was filled completely with materials although a resin-rich part was observed at base 9 of the upright part. FIG. 19 shows the neighborhood of the resin-rich part. At base 9 of the upright part, resin-rich part 26 was observed only in a region of skin layer 2, but a region of penetration part 4. It is understood that it is because epoxy resin contained in skin layer 2 seeped to groove 23 of mold to form a resin-rich part and then a fluid core layer (forming material 6) flowed through penetration part 4 into groove 23 at the side of skin layer 2 to form the upright part filled completely with materials. Because an upright part of which base is resin-rich tends to have low strength, it is preferable to provide a penetration part having an area greater than that of groove 23 in material having a fluidity too poor to flow into groove 23 together with fibers. The evaluation results are shown in Table 2.

Comparative Example 2

After a sandwich precursor was prepared with the forming material shown in Table 3 in the same manner as Example 1, the forming mold of Material Example 22 was regulated at 200° C. and the sandwich precursor placed in the depressed part of lower mold and then the upper mold was lowered for pressurizing at surface pressure of 1 MPa for two minutes. The surface pressure was increased to 15 MPa to pressurize it for 6 minutes, and then the upper and lower molds were cooled by flowing coolant water. After having confirmed that the mold temperature was below 80° C., the upper mold was elevated to prepare a shaped product.

Thus prepared shaped product had an excellent surface appearance without trace like blur and holes. The upright part formed in a region of penetration part of forming material S-1-1 was filled completely with materials without resin-rich part and blur, although the skin layer was not provided with a penetration part. Further, glass fibers were observed partially at base 9 of the upright part while carbon fibers were observed in almost all regions of the upright part. Cross section observation of cross section of prepared shaped product confirmed that forming material K-7 constituting a fluid core layer flowed into groove 23 by breaking through forming material S-10 constituting the skin layer to make a continuously formed fluid core layer and upright part. The evaluation results are shown in Table 3.

Comparative Example 3

After a sandwich precursor was prepared with the forming material shown in Table 3 in the same manner as Example 1, the same forming mold of Material Example 22 as Example 1 was regulated at 150° C. and the sandwich precursor placed in the depressed part of lower mold and then the upper mold was lowered for press forming to prepare a shaped product in the same condition as Example 1.

The appearance quality of the face plate was good. However, the upright part was filled with resin by about 60% only, because the skin layer was not provided with a penetration part although the resin in the skin layer flowed into a part of the upright part. Further, the upright part had low strength because it was filled with resin mostly. This is because the matrix resin constituting the skin layer and fluid core layer was a thermosetting resin having a resin viscosity lower than that of the thermoplastic resin in Comparative Example 2. We believe the thermosetting resin having a low resin viscosity couldn't generate a sufficient power to carry the discontinuous fibers by flowing resin and therefore only the thermosetting resin seeped from the forming material into the upright part even when it was formed in the same manner. The evaluation results are shown in Table 3.

Example 7

The forming materials shown in Table 2 were used. After a sandwich precursor was prepared in the same manner as Example 4 except that the penetration part had a smaller area, the same forming mold of Material Example 22 as Example 4 was regulated at 150° C. and the sandwich precursor placed in the depressed part of lower mold and then the upper mold was lowered for press forming to prepare a shaped product in the same manner as Example 4.

Thus prepared shaped product had an excellent surface appearance without trace like blur and holes. The upright part was filled completely with materials. However, a resin-rich part was observed partially at base 9 of the upright part. The resin-rich part was observed only in a region of skin layer 2 but a region of penetration part 4. The evaluation results are shown in Table 2.

Comparative Example 4

The forming materials shown in Table 3 were used. After a sandwich precursor was prepared in the same manner as Example 7 except that the penetration part was not provided, the same forming mold of Material Example 22 as Example 7 was regulated at 150° C. and the sandwich precursor placed in the depressed part of lower mold and then the upper mold was lowered for press forming to prepare a shaped product in the same manner as Example 7.

Thus prepared shaped product had an excellent surface appearance without trace like blur and holes. However, the upright part was filled with resin by about 50% only because the skin layer was not provided with a penetration part although forming material K-6 constituting the fluid core layer and the skin layer flowed into a part of the upright part. The evaluation results are shown in Table 3.

Example 8

The forming materials shown in Table 2 were used. After a sandwich precursor was prepared in the same manner as Example 3 except that forming material K-9 was used as a light core layer and layers other than the fluid core layer made of forming material K-6 were provided with a penetration part, the same forming mold of Material Example 22 as Example 3 was regulated at 150° C. and the sandwich precursor placed in the depressed part of lower mold and then the upper mold was lowered for press forming to prepare a shaped product in the same manner as Example 3.

The evaluation of thus prepared shaped product was good as shown in Table 2. Further, the shaped product had a density smaller than that in Example 3.

Example 9

The forming materials shown in Table 2 were used. Forming material S-1-1 (with penetration part) prepared in Example 1 constituted the skin layer while forming material K-11 constituted the core layer. Forming material K-11 was cut into the shape shown in FIG. 17 according to the following dimensions:

Forming material K-11 (with penetration part): W13; 400 mm, W14; 200 mm.

Then, the forming materials were laminated so that all the penetration parts provided on forming material S-1-1 were stacked in the thickness direction to prepare a sandwich precursor having the lamination shown in Table 2 in the same manner as Example 1. Next, the forming mold of Material Example 22 was regulated at 150° C. and the sandwich precursor placed in the depressed part of lower mold and then the upper mold was lowered for press forming to prepare a shaped product in the same manner as Example 1.

Thus prepared shaped product had an excellent surface appearance without trace like blur and holes. The upright part formed in a region of penetration part of forming material S-1-1 was filled completely with materials without resin-rich part and blur. The upright part was formed continuously with the fluid core layer through the penetration part. A region of the penetration part provided in forming material S-1-1 became wave-permeable area because the region of the penetration part provided in forming material S-1-1 only contained forming material K-11 being wave-permeable in the thickness direction although forming material S-1-1 had electric wave shielding characteristics derived from carbon fiber contained. The evaluation results are shown in Table 2.

Example 10

After the sandwich precursor prepared with the forming materials shown in Table 2 in the same manner as Example 1 was sandwiched by metal plates and placed on the lower board surface of heat pressing machine regulated at 170° C., the upper board surface was lowered and heated at surface pressure of 1 MPa for 6 minutes to prepare a sandwich structure in which epoxy resin in forming material S-1 constituting skin layer cured, polypropylene resin of forming material K-7 constituting core layer melted and forming materials were integrated. Then, the sandwich structure was immediately conveyed to a forming mold in Material Example 22 at mold temperature regulated at 80° C. and placed at the depressed part of the lower mold. After the upper mold was lowered to pressurize it at surface pressure of 15 MPa for 1 minute, the upper mold was elevated to produce a shaped product.

Thus prepared shaped product had an excellent surface appearance without trace like blur and holes. The upright part formed in a region of penetration part of forming material S-1-1 was filled completely with materials without resin-rich part and blur. The upright part was formed continuously with the fluid core layer through the penetration part. The evaluation results are shown in Table 2.

INDUSTRIAL APPLICATIONS

Our shaped products produced by our methods can effectively be used as interior/exterior material for automobile, electric and electronic equipment, housing, bicycle, structural material for sport gear, plane interior material, transportation box or the like.

The invention claimed is:

1. As sandwich structure comprising a skin layer and a core layer, the skin layer including at least one layer of:
   a metal layer;
   a fiber reinforced resin layer (X) comprising a matrix resin (A) reinforced with continuous fibers along a total length and a total width of the sandwich structure; and
   a fiber reinforced resin layer (Y) comprising discontinuous fibers and a thermosetting matrix resin (B), and is not reinforced with continuous fibers along the total length of the sandwich structure or is not reinforced with continuous fibers along the total width of the sandwich structure,
   wherein the core layer includes a fluid core layer comprising discontinuous fibers and a matrix resin (C), and is not reinforced with continuous fibers along the total length of the sandwich structure or is not reinforced with continuous fibers along the total width of the sandwich structure,
   the skin layer is made of a material having a bending elastic modulus higher than that of the core layer, and
   the skin layer at a non-design face side is provided at least partially with a penetration part.

2. The sandwich structure according to claim 1, wherein the fiber reinforced resin layer (X) is either a unidirectional fiber reinforced resin layer comprising unidirectional continuous fibers as the continuous fibers and a thermosetting resin as the matrix resin (A) or a woven fiber reinforced resin layer comprising unidirectional continuous fibers as the continuous fibers and a thermosetting resin as the matrix resin (A), the skin layer being a laminate consisting of one or more layers of the unidirectional fiber reinforced resin layer and/or the woven fiber reinforced resin layer.

* * * * *